US012583731B2

(12) United States Patent
Quartarone et al.

(10) Patent No.: US 12,583,731 B2
(45) Date of Patent: Mar. 24, 2026

(54) BEVERAGE DISPENSER WITH ADVANCED PORTION CONTROL AND POINT-OF-SALE INTEGRATION

(71) Applicant: The Coca-Cola Company, Atlanta, GA (US)

(72) Inventors: Daniel Quartarone, Hoschton, GA (US); Quyen Tran, Atlanta, GA (US); Jeff Neaves, Duluth, GA (US); Austin Igleheart, Atlanta, GA (US); David Vogt, Atlanta, GA (US); Brian Salvati, Atlanta, GA (US); Elaine Von Uffel, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 523 days.

(21) Appl. No.: 18/010,054

(22) PCT Filed: Jun. 18, 2021

(86) PCT No.: PCT/US2021/038079
§ 371 (c)(1),
(2) Date: Dec. 13, 2022

(87) PCT Pub. No.: WO2021/257986
PCT Pub. Date: Dec. 23, 2021

(65) Prior Publication Data
US 2023/0312327 A1 Oct. 5, 2023

Related U.S. Application Data

(60) Provisional application No. 63/040,962, filed on Jun. 18, 2020.

(51) Int. Cl.
*B67D 1/12* (2006.01)
*B67D 1/08* (2006.01)

(52) U.S. Cl.
CPC ........... *B67D 1/124* (2013.01); *B67D 1/0888* (2013.01); *B67D 1/1236* (2013.01)

(58) Field of Classification Search
CPC ..... B67D 1/124; B67D 1/1236; B67D 1/0888
See application file for complete search history.

(56) References Cited

U.S. PATENT DOCUMENTS 4,944,335 A 7/1990 Stembridge et al.
7,578,415 B2 8/2009 Ziesel et al.
(Continued)

FOREIGN PATENT DOCUMENTS

CN 108025899 A 5/2018
CN 110267906 A 9/2019
(Continued)

OTHER PUBLICATIONS

Machine translation of JP-2002104592-A.*
(Continued)

*Primary Examiner* — Jeremy Carroll
(74) *Attorney, Agent, or Firm* — Meunier Carlin & Curfman LLC

(57) ABSTRACT

A beverage dispensing system is configured to facilitate communication between a point-of-sale terminal and a beverage dispenser for receiving and fulfilling beverage orders. The dispensing system comprises a translation server that maps beverage orders between the point-of-sale entry data and beverage dispenser recipe data. An automatic portion control (APC) assembly comprises a mass sensor that is configured to determine a mass of a cup resting thereon. Using the mass of the cup, the dispenser makes a cup size prediction and performs portion control dispensing operations. Based on the cup size prediction, a user interface is modified to allow for quicker interactions. The APC assembly is positioned beneath a nozzle of the beverage dispenser
(Continued)

and comprises a removable platform assembly magnetically coupled to a mass sensor assembly. The mass sensor assembly comprises a load cell or other mass sensor.

20 Claims, 18 Drawing Sheets

(56) References Cited

U.S. PATENT DOCUMENTS

| | | | | |
|---|---|---|---|---|
| 7,866,509 | B2 | 1/2011 | Ziesel et al. | |
| 8,333,224 | B2 | 12/2012 | Sheehy et al. | |
| 9,227,830 | B2 | 1/2016 | Angus et al. | |
| 9,394,154 | B2 | 7/2016 | Connerat et al. | |
| 11,084,704 | B2 | 8/2021 | Sawhney et al. | |
| 2007/0212468 | A1 | 9/2007 | White et al. | |
| 2008/0164274 | A1 | 7/2008 | Stettes | |
| 2010/0326562 | A1 | 12/2010 | Sheeny et al. | |
| 2011/0023722 | A1* | 2/2011 | Tonelli | A47J 31/4428 99/279 |
| 2011/0036452 | A1 | 2/2011 | Schnyder | |
| 2013/0037565 | A1 | 2/2013 | Newman | |
| 2014/0040055 | A1 | 2/2014 | Quartarone et al. | |
| 2014/0263454 | A1 | 9/2014 | Connerat et al. | |
| 2015/0039776 | A1 | 2/2015 | Jarnagin, III | |
| 2015/0082243 | A1 | 3/2015 | Taylor et al. | |
| 2016/0325980 | A1 | 11/2016 | Sawhney et al. | |
| 2017/0096324 | A1 | 4/2017 | Dresser et al. | |
| 2018/0162710 | A1 | 6/2018 | Moore et al. | |
| 2019/0177148 | A1* | 6/2019 | Gagne | B67D 1/0042 |
| 2019/0330042 | A1 | 10/2019 | Enssle et al. | |
| 2019/0359470 | A1 | 11/2019 | Joshi et al. | |
| 2020/0034784 | A1 | 1/2020 | Schwarber et al. | |

FOREIGN PATENT DOCUMENTS

| | | | | | |
|---|---|---|---|---|---|
| DE | 10205944 | A1 | | 8/2003 | |
| JP | 2002104592 | A | * | 4/2002 | |
| WO | WO-2004096694 | A1 | * | 11/2004 | B67D 1/1252 |
| WO | 2015167846 | A1 | | 11/2015 | |
| WO | 2017058794 | A1 | | 4/2017 | |
| WO | 2021257215 | A1 | | 12/2021 | |

OTHER PUBLICATIONS

Communication pursuant to Article 94(3) EPC issued in EP21825344.1, mailed Mar. 14, 2025.

International Preliminary Report on Patentability dated Dec. 29, 2022.

Extended European Search Report issued in EP21825344.1, mailed May 22, 2024.

International Search Report and Written Opinion issued in PCT/US2021/038079, mailed Oct. 13, 2021, 9 Pages.

English translation of Chinese Office Action issued in CN202180042853X, mailed May 30, 2025.

* cited by examiner

APC Platform Asm

Drip Tray Asm

BEVERAGE DISPENSER WITH ADVANCED PORTION CONTROL AND POINT-OF-SALE INTEGRATION

CROSS-REFERENCE TO RELATED APPLICATIONS

This application is a national phase entry under 35 U.S.C. § 371 of International Application No. PCT/US2021/038079, filed on Jun. 18, 2021, which claims the benefit of U.S. Provisional Application Ser. No. 63/040,962 filed Jun. 18, 2020, the disclosures of which are expressly incorporated herein by reference.

BACKGROUND

Establishing communication between a point-of-sale (POS) device and a beverage dispenser facilitates display and fulfillment of beverage orders on the beverage dispenser. One example of the use of communications between a POS and a dispenser is shown in commonly owned U.S. Publication 2014/0040055 to Quartarone et al., herein incorporated by reference in full. Automatic beverage dispensing systems facilitate automated fulfilment of beverages, but require support equipment to facilitate the automated filling of beverages. One example of an automated beverage dispenser is shown in commonly owned U.S. Pat. No. 9,227,830 to Angus et al., herein incorporated by reference in full.

SUMMARY

In a first aspect of the disclosure, a beverage dispenser comprises a nozzle configured to dispense one or more beverage ingredients. The beverage dispenser comprises a user interface configured to receive a selection to dispense a beverage. The beverage dispenser comprises a mass sensor configured to measure the mass of a cup placed thereon. The beverage dispenser comprises a plurality of pumping or metering devices, each configured to supply a beverage ingredient from an ingredient source to the nozzle. The beverage dispenser comprises a controller configured to determine a volume of the beverage to dispense from the nozzle based on the measured mass of the cup and instruct one or more of the plurality of pumping or metering devices to dispense the volume of the beverage from the nozzle.

In some implementations of the first aspect of the disclosure, the controller is further configured to determine a volume of the cup based on the measured mass of the cup with its contents.

In some implementations of the first aspect of the disclosure, the controller is further configured to stop dispensing the beverage from the nozzle prior to dispensing the volume of the beverage in response to determining that the measured mass of the cup does not change more than a threshold amount over a predetermined time interval.

In some implementations of the first aspect of the disclosure, the controller is further configured to stop dispensing the beverage from the nozzle prior to dispensing the volume of the beverage in response to determining that the measured mass of the cup reduced in mass.

In some implementations of the first aspect of the disclosure, the controller is configured to determine the volume of the cup with a first cup detection algorithm that assumes the cup is empty and a second cup detection algorithm that assumes the cup contains contents.

In some implementations of the first aspect of the disclosure, the controller is configured to determine with the first cup detection algorithm a preliminary cup size prediction that selects each cup size with a mass that is within a match threshold of the measured mass of the cup.

In some implementations of the first aspect of the disclosure, the controller is configured to determine the volume of the cup upon selection of a cup size from the selected cups of the preliminary cup size prediction with a smallest absolute difference between a mass of the selected cups and the measured mass of the cup.

In some implementations of the first aspect of the disclosure, the controller is configured to compare with the second cup detection algorithm the measured mass of the cup with a known list of cup masses of different cup sizes determined based on an expected mass of each of the different cup sizes when it is full of ice and an expected fraction of each of the different cup sizes that is expected to be filled with ice.

In some implementations of the first aspect of the disclosure, the controller is configured to determine a preliminary cup size prediction that selects each cup size associated with the known list of cup masses with a mass that is within an upper match threshold and a lower match threshold of the measured mass of the cup.

In some implementations of the first aspect of the disclosure, the controller is configured to determine the volume of the cup upon selection of a cup size from the selected cups of the preliminary cup size prediction with a smallest absolute difference percent between a mass of the selected cups and the measured mass of the cup.

In some implementations of the first aspect of the disclosure, the user interface is configured to displays a cup size based on the determined volume of the cup.

In some implementations of the first aspect of the disclosure, the user interface is configured to receive a selection of a different cup size.

In some implementations of the first aspect of the disclosure, the mass sensor is located beneath the nozzle.

In some implementations of the first aspect of the disclosure, the mass sensor comprises a platform assembly releasably coupled to a mass sensor assembly.

In some implementations of the first aspect of the disclosure, the platform assembly comprises a cup rest, a central fluid diverter, and a drain.

In some implementations of the first aspect of the disclosure, the central fluid diverter comprises a magnetic insert.

In some implementations of the first aspect of the disclosure, the mass sensor assembly comprises a magnet holder with a magnet held therein, the magnet holder coupled to a sensor body, and the magnet holder positioned to align with the magnetic insert.

In some implementations of the first aspect of the disclosure, the sensor body comprises a load cell, wherein the load cell comprises a first end coupled to a housing of the mass sensor assembly and a second end coupled to the magnet holder.

In some implementations of the first aspect of the disclosure, the load cell comprises one or more strain gauges.

In some implementations of the first aspect of the disclosure, the mass sensor assembly comprises a control board electrically coupled to the strain gauges.

In some implementations of the first aspect of the disclosure, the selection to dispense the beverage comprises a size of the cup.

In some implementations of the first aspect of the disclosure, the controller is further configured to determine that the measured mass of the cup is within a valid mass range for the size of the cup.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
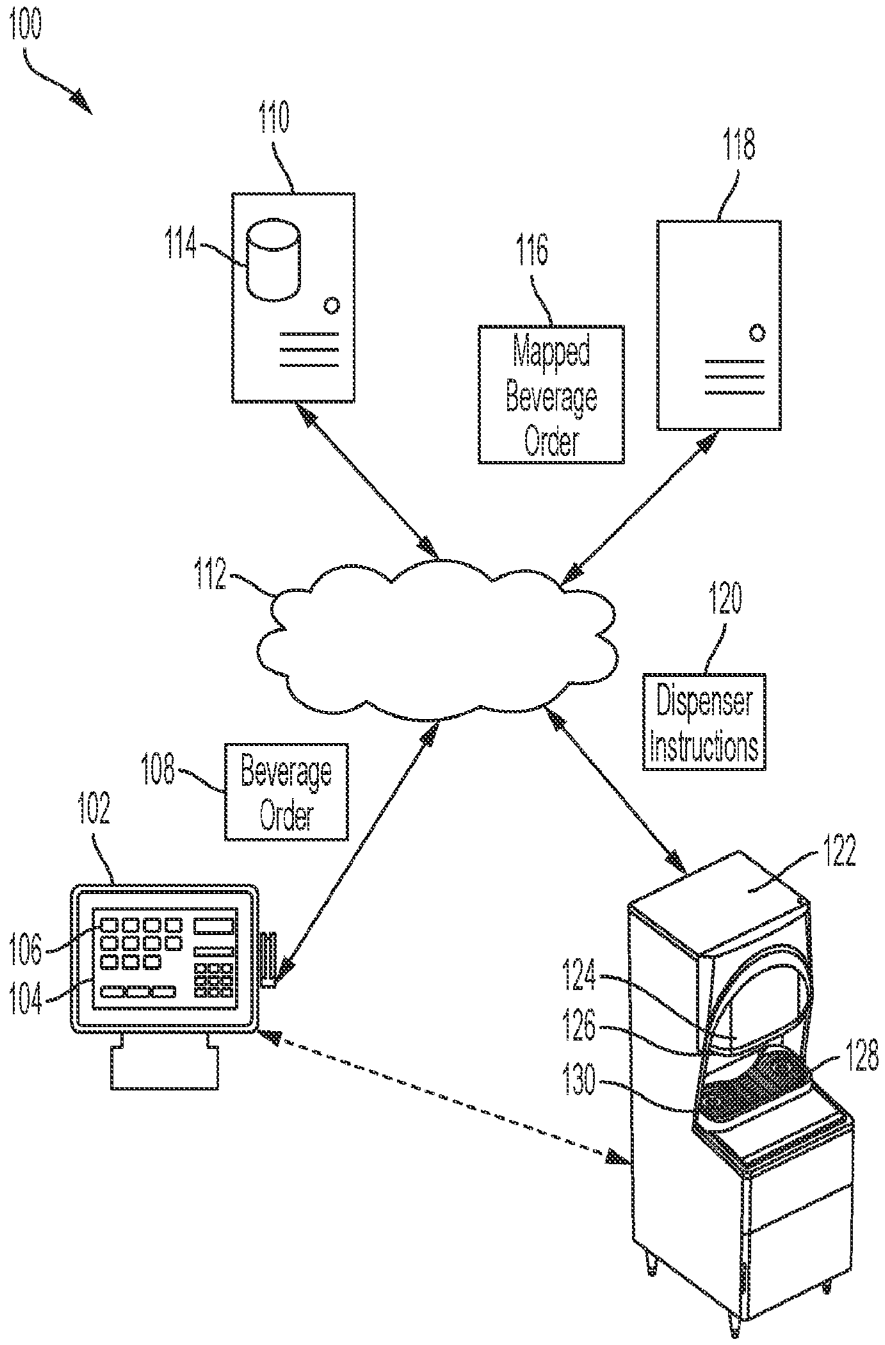
FIG. 1 illustrates an exemplary system block diagram of a beverage dispensing system suitable for various embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A", "B", and/or "C" means "A", or "B", or "C", or "A and B", or "A and C", or "A and B and C".

A beverage dispensing system for receiving orders and facilitating the fulfillment of orders is described in detail below with regard to FIGS. 1-20. The beverage dispensing system may be configured to facilitate communication between a point-of-sale (POS) terminal and a beverage dispenser for receiving and fulfilling beverage orders. The dispensing system may comprise a translation server that maps beverage orders between POS entry data and beverage dispenser recipe data. Accordingly, crew members save time because beverage orders received at the POS terminal are communicated to the dispenser.

The beverage dispensing system comprises a beverage dispenser with an automatic portion control system, thereby allowing crew members to leave the dispenser unattended while filling. In an embodiment, the automatic portion control system comprises a mass sensor that is configured to determine a mass of a cup resting thereon. Using the mass of the cup, the dispenser may make a cup size prediction and aid in portion control dispensing operations. For example, the mass of the cup may be used to determine how much beverage to dispense to fill the cup. The system may be further configured to estimate the cup size and modify a user interface (UI) of the beverage dispenser (e.g., highlighting or only showing beverages within an order that correspond to predicted cup size) to allow for quicker UI interactions upon filling beverage orders.

Described herein are example systems and methods for facilitating the process between receiving and fulfilling beverage orders. For example, a beverage dispensing system receives beverage orders from point-of-sale terminals and communicates them to a beverage dispenser. The beverage dispenser may include cup prediction and portion control algorithms such that the beverage dispenser can detect and determine a cup size as well as dispense a beverage without crew member supervision. Such functionality allows crew members to save time and fulfill orders more efficiently. The disclosed system and methods can be used with a variety of beverage dispensers.

As is generally understood, beverage selections may be made through a touchscreen user interface or other typical beverage user interface selection mechanism (e.g., buttons) on a point-of-sale device. The selected beverage, including any selected flavor additives, may then be dispensed from a beverage dispenser upon the beverage dispenser receiving a further dispense command through a separate user interface. For example, a dispense button on a touchscreen user interface on the beverage dispenser or through interaction with a separate pour mechanism such as a pour button (electromechanical, capacitive touch, or otherwise) or pour lever.

While various examples are provided herein of crew serve beverage dispensers, it is contemplated that the weight sensor, cup prediction and portion control algorithm and other features described herein can be used in other beverage dispenser systems. For example, the weight sensor and cup prediction and portion control algorithm could be used on any portion control dispenser. Likewise, the weight sensor and cup prediction and portion control algorithm could be used on an automatic beverage dispenser, such as the automated beverage dispenser shown in commonly owned U.S. Pat. No. 9,227,830 to Angus et al.

FIG. 1 illustrates an exemplary system block diagram of a beverage dispensing system 100 according to various embodiments of the disclosure. The dispensing system 100 includes a point-of-sale (POS) terminal 102, a mapping server 110, a dispenser network server 118, and a beverage dispenser 122. Generally described, the beverage dispensing system 100 links the POS terminal 102 with the beverage dispenser 122 for receiving and fulfilling beverage orders. The beverage dispenser 122 may be placed in an outlet such as, but not limited to, restaurants, malls, sports venues, or any other public or private location at which a consumer may purchase a beverage from the beverage dispensing system 100. The POS terminal 102 may be located at the outlet with the beverage dispenser 122. In some implementations, the POS terminal 102 may be a user's phone, computer, or other personal terminal with which an order is placed through a mobile application or via a website.

The POS terminal 102 receives a beverage order 108 which is translated into dispenser instructions 120 with the aid of the mapping server 110 and dispenser network server 118. The beverage dispenser 122 receives the dispenser instructions 120 and fulfills the beverage order 108. The POS terminal 102 may be any type of user interaction terminal, such as a conventional cash registers, touch screen terminal, or similar types of order input devices typically found in quick service restaurants and other types of retail establishments. Instructions or requests may be entered by a crew member, a consumer, or anyone else. While only one POS terminal 102 is shown in FIG. 1, it is understood that a plurality of such terminals may be used in the beverage dispensing system 100. Other components and other configurations are contemplated by this disclosure.

The POS terminal 102 has a user interfaces (UI) 104, such as a touch screen user interface, keyboard and display, or any other conventional POS user interface. In the example shown, the UI 104 is a touchscreen. The UI 104 may have one or more menu screens, each with one or more icons 106 for receiving selections of items to include in an order, such as one or more beverage selections. The icons 106 may include any number of beverage icons. The beverage icons may relate to any type, flavor, or size of beverage. The POS terminal 102 receives selections through the UI 104 via the icons 106 for generating a beverage order 108. In some implementations, the beverage icons may include beverages that are poured from equipment other than the beverage dispenser 122, such as an iced coffee or milkshake. However, such beverage orders may nonetheless be included in the beverage order and displayed on the beverage dispenser, as discussed below. In various implementations, the beverage order 108 may be a portion or sub-set of a larger customer order that also includes other items such as food selections. The beverage order 108 may be stripped out or otherwise separated from the larger customer order. The beverage order 108 may comprises one or more beverages, each with an associated size (e.g., small, medium, large, etc.) and optionally specialty instructions (e.g., no, light, or heavy ice). The POS terminal 102 communicates the generated beverage order 108 to a mapping server 110 via a network 112. The network 112 may be one or more networks, such as the Internet, an on-premise wired or wireless network at an outlet, a dispenser network, a local area network, a wide area network, or any other network or communication pathway for communicating between devices. In various implementations, different devices may communicate with one another using different networks or direct wired or wireless communication links. In some implementations, the POS terminal 102 connected to the beverage dispenser 122 directly as shown by the dotted line therebetween, such as via an Ethernet cable or other hardwire or wireless connection for directly communicating beverage orders from the POS terminal 102 to the beverage dispenser 122.

Typically, POS terminals have menu screens organized from general to specific options. For example, a first screen or portion of a screen may include a first one of the icons 106 for receiving a selection to include a beverage as part of an order. A second screen or portion of a screen may include a second one of the icons 106 for receiving a selection of a brand for the beverage (e.g., cola, orange, lemon-lime, or brand identification, etc.). A third screen or portion of a screen may include a third one of the icons 106 for receiving a selection of one or more modifiers for the beverage (e.g., cherry, grape, other flavoring, limited ice, etc.). For example, the beverage order 108 may comprise a CHERRY COKE with a lime flavor additive beverage as a Coca-Cola+Cherry+Lime beverage. Other POS terminals may have different menu screens.

The mapping server 110 facilitates the translation between a beverage order 108 and dispenser instructions 120. The beverage order 108 is translated into a mapped beverage order 116 because the beverage order 108 is created based on modifiers (e.g. Diet Coke plus cherry plus vanilla) whereas the beverage dispenser 122 fulfills orders based on recipes based on the dispenser instructions 120. The mapping server 110 includes a mapping table 114 for translating between the POS terminal 102 and the beverage dispenser 122. The mapping table 114 may differ or different mapping tables (not shown) may be provided depending on the outlet in which the POS terminal 102 is located or type of POS terminal 102 used. The mapping server 110 receives the beverage order 108 via the network 112 and translates the beverage order 108 into a mapped beverage order 116. For example, the mapping server 110 may translate the Coca-Cola+Cherry+Lime beverage from the beverage order 108 into a CHERRY COKE with a lime flavor additive beverage in the mapped beverage order 116. A CHERRY COKE has a specific recipe that is used by the beverage dispenser 122 to dispense that beverage. In various implementations, the mapped beverage order 116 may include one or more of a beverage code, and zero, one, or more flavor codes. For example, rather than including CHERRY COKE in the mapped beverage order 116, the beverage code may be a numeric or alphanumeric string that corresponds to CHERRY COKE. The mapping server 110 sends the mapped beverage order 116 to the dispenser network server 118 via the network 112.

The dispenser network server 118 receives the mapped beverage order 116 and transmits dispenser instructions 120 accordingly. The dispenser network server 118 sends the dispenser instructions 120 to the beverage dispenser 122 via the network 112.

The beverage dispenser 122 receives the dispenser instructions 120 and is used to fulfill the order. The beverage dispenser 122 may include a nozzle 126 and a user interface (UI) 124. For example, the user interface may be a touchscreen user interface. The beverage dispenser 122 may have a variety of possible user interface screens with associated icons (not shown) displayed on the UI 124. The nozzle 126 is configured to dispense one or more beverages from the beverage dispenser 122, such as by mixing two or more ingredients together to form a dispensed beverage.

The beverage dispenser 122 includes a drip tray 128 with an automatic portion control (APC) assembly 130 positioned beneath the nozzle 126. The APC assembly 130 includes a mass sensor that is used by the beverage dispenser 122 to detect a cup and predict a cup size as well as to implement advanced portion control algorithms that allow a crew member to leave the beverage dispenser 122 unattended while a beverage order is being dispensed, as described herein below. The beverage dispenser 122 may have cup detection and advanced portion control algorithms that are used to fill a cup to a desired level regardless of whether it is partially full of liquid, contains a variable amount of ice, or is empty. This provides the crew member with more flexibility to leave the beverage dispenser 122 unsupervised while a selected beverage is being filled.

While the POS terminal 102 is shown to communicate beverage orders with the beverage dispenser 122 via the network 112, the mapping server 110, and the dispenser network server 118, in various implementations, the POS terminal 102 may communicate directly with the beverage dispenser 122 via a direct wired or wireless communication. In such implementations, the beverage dispenser 122 may maintain the mapping table 114 locally for mapping between beverage orders or beverage selections and dispenser instructions. Alternatively or additionally, beverage orders may be entered directly on the user interface 126 of the beverage dispenser 122. That is, the POS terminal 102 may be implemented on the user interface 126 of the beverage dispenser.

While described above with reference to entry of beverage orders on a beverage dispenser 122, the APC assembly 130 may be used with any beverage dispenser where a size selection is received on the user interface 126 of the beverage dispenser. For example, a standard crew serve dispenser where each nozzle dispenses a different beverage and size selection buttons are used in a portion control dispense operation or any other beverage dispenser where portion control dispensing is desired. Other types of beverage dispensers are contemplated by this disclosure.

Figure 2:
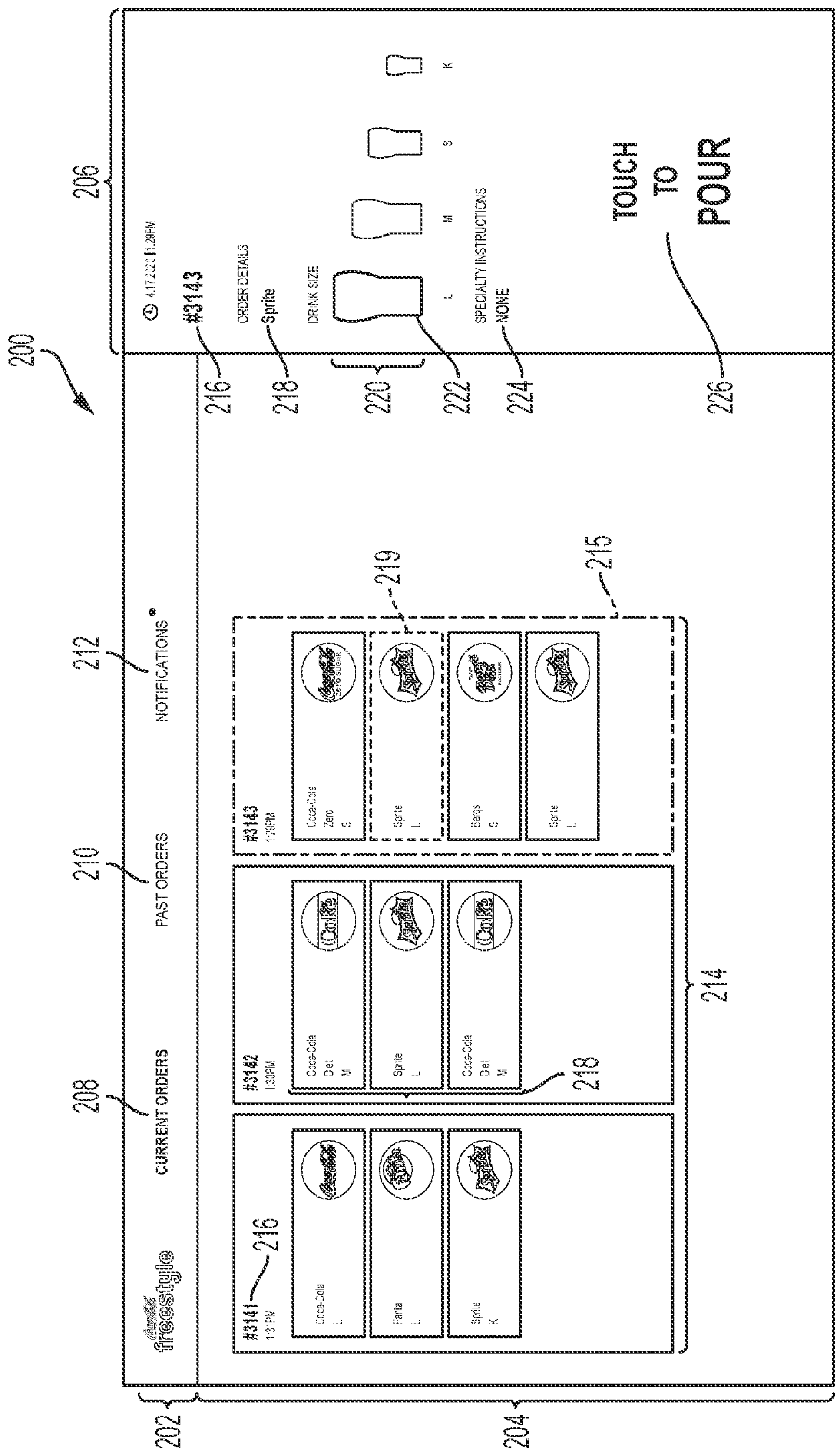
FIG. 2 illustrates an exemplary user interface with a selected order and selected beverage within the order to be dispensed suitable for various embodiments of the disclosure.

FIG. 2 illustrates an exemplary screen 200 that may be displayed on the user interface 124. The screen 200 has a navigation area 202, an order area 204, and a beverage details area 206. The navigation area 202 has a current orders tab 208, a past orders tab 210, and a notifications tab 212. A currently selected tab is highlighted or otherwise has a distinguishing appearance from the other tabs. In the example shown, the current orders tab 208 is bolded to indicate that the current orders tab 208 is selected.

When the current orders tab 208 is selected, the order area 204 displays a list of current beverage orders 214 to be fulfilled. Each beverage order 214 is associated with an order identifier (ID) 216 and includes one or more beverages 218 to be fulfilled for the beverage order 214. Each of the beverage 218 identifies a brand and size of the beverage to be filled. A currently selected one of the beverage orders 214 is highlighted or otherwise has a distinguishing appearance from the other beverage orders 214. In the example shown, a currently selected beverage order 215 is shown with the order ID 216 of #3143 as currently selected. A currently selected beverage 219 of the beverages 218 is highlighted or otherwise has a distinguishing appearance from the other beverage 218. In the example shown, the currently selected beverage 219 is for a Large SPRITE.

The beverage details area 206 shows details of the currently selected beverage. In the example shown, the order identifier 216 and the selected beverage 219 are shown. A cup size prediction area 220 includes a plurality of cup size icons (e.g., Large, Medium, Small, Extra-Small), where a highlighted icon 222 indicates a size of a cup the beverage dispenser 122 predicts is positioned on the APC assembly 130 under the nozzle 126, as described in more detail below. In the example shown, the beverage dispenser 122 has detected a cup on the APC assembly 130 and predicted that it is a Large size as shown by the Large cup icon being highlighted in the cup size prediction area 220.

The user interface 124 displays information and makes it possible for a crew member to override a cup prediction algorithm or decide which beverage should be fulfilled. The predicted cup is indicated by the highlighted icon 222. In some implementations, the predicted cup size determines which beverages 218 are selectable (e.g. if a large cup is detected, only the large beverage 218 within the beverage orders 214 will be selectable). other beverages 218 may be grayed out or otherwise unresponsive to selection. In the example shown, the two small beverages in the currently selected order 319 are grayed out to prevent their selection while the beverage dispenser 122 has detected the presence of a large cup. In various implementations, if the wrong size is predicted, the UI 124 may receive a selection of the correct cup size in the cup size prediction area 220. For example, upon a Large cup being placed on the APC assembly 130, if the beverage dispenser 122 predicts the cup as a Medium size cup, a selection of the Large cup icon in the cup size prediction area 220 may be received to change the highlighted icon in the cup size prediction area 220 from the Medium cup icon to the Large cup icon. Alternatively or additionally, upon a Large cup being placed on the APC assembly 130, if the beverage dispenser 122 predicts the cup as a Medium size cup, upon a beverage 218 being selected with a different size (e.g., Large), the highlighted icon in the cup size prediction area 220 may change from the Medium cup icon to the Large cup icon.

In various implementations, the volume of each of the cup sizes is a configured value on the beverage dispenser 122. For example, some outlets may have a Large cup size that is 42 oz., whereas other outlets may have a Large cup size that is 48 oz. Depending upon the outlet in which the beverage dispenser 122 is places, the volume of each cup size is configured accordingly. For example, U.S. Pat. No. 8,306,655, "Systems and Methods for Providing Portion Control Programming in a Product Forming Dispenser," granted on Nov. 6, 2012, hereby incorporated by reference in its entirety, discloses a configuration screen for configuring variables of a portion control algorithm of the beverage dispenser 122. The variables may include a cup size name (e.g., Small, Medium, Large, etc.) and corresponding volume (e.g., fluid ounces in each cup size), an ice fill amount used at the outlet (e.g., no ice, ½ cup full, ½ cup full, ¾ cup full, full), an ice type (e.g., none, pellet, flake, crushed, cube), a number of top-ups (e.g., 0, 1, 2) for each type of beverage (e.g., low foam, medium foam, high foam), a delay between top-ups, and other such configuration settings for the portion control algorithm.

The beverage details area 206 also shows specialty instructions 224, such as an indication of no specialty instructions, no ice, low ice, medium ice, or heavy ice. Based on the specialty instructions, a crew member may modify the amount of ice present in a cup for filling the order. Other additional information supplied from the POS or passed through by the POS may be displayed in the beverage details area 206.

The order detail area 206 also displays a touch to pour icon 226. The touch to pour icon 226 may only be displayed if a cup has been detected and a size of the cup has been determined by a cup size prediction algorithm of the beverage dispenser 122. After a crew member confirms the order detail area 206 is correct, the crew member presses the touch to pour icon 226 and the selected beverage 218 from the selected beverage order 214 is dispensed from a nozzle 126 on the beverage dispenser 122. Alternatively or additionally, upon selection of a beverage 218, the selected beverage 218 from the selected beverage order 214 is dispensed from a nozzle 126 on the beverage dispenser 122.

Upon successfully filling the selected beverage 218 (e.g., no errors and cup not removed prematurely), the selected beverage 218 may be grayed out or otherwise have a distinctive appearance or accompanying icon (e.g., check mark) to indicate that the beverage 218 has been filled. In the example shown, a Small COCA-COLA ZERO beverage and a Small BARQ's beverage are greyed out, indicating that those beverages may have already been poured or are currently unavailable to be dispensed.

Upon all of the beverages 218 in a beverage order 214 being filled, the beverage order 214 may be removed from the order area 204. In some implementations, the beverage order 214 may be removed from the order area 204 a predetermined amount of time (e.g., 1-10 seconds) after the beverages 218 have been successfully filled. In some implementations, an "x" button or other icon (not shown) may be selected upon the beverages 218 in the beverage order 214 being filled. Other display arrangements and manipulations of current orders in the order area 204 are contemplated by this disclosures, such as those described in U.S. Pub. No. 2014/0040055 to Quartarone et al., "Systems and Methods for Dispensing Products Selected at Remote Point-of-Sale Devices", filed on Aug. 6, 2012, hereby incorporated by reference in its entirety.

Upon selection of the past orders tab 210, the order area 204 may be updated to show a predetermined number of past orders. The past orders may be arranged chronologically by order receipt or order fulfillment. In various implementations, a user may scroll through a list of past orders. Being able to navigate to past orders facilitates easy filling of refills.

Upon selection of the notifications tab 212, the order area 204 may be updated to show notifications concerning the ingredients or components of the beverage dispenser 122, such as identifications of ingredients that need to be replaced. In various implementations, the order area 204 may additionally include one or more food orders and function as a comprehensive order monitoring system or bump screen. The notifications tab 212 may also display other notifications or alerts from other equipment in the outlet, such as those described in U.S. Pub. No. 2020/0034784 to Schwarber et al., "Product Inventory Management for Product Dispensers at Venue," filed Jul. 30, 2019, and U.S. Pub. No. 2019/0359470, to Joshi et al., "Proactive Dispenser to Operator Mobile Alert System," filed Sep. 8, 2017, hereby incorporated by reference in their entirety.

Figure 3:
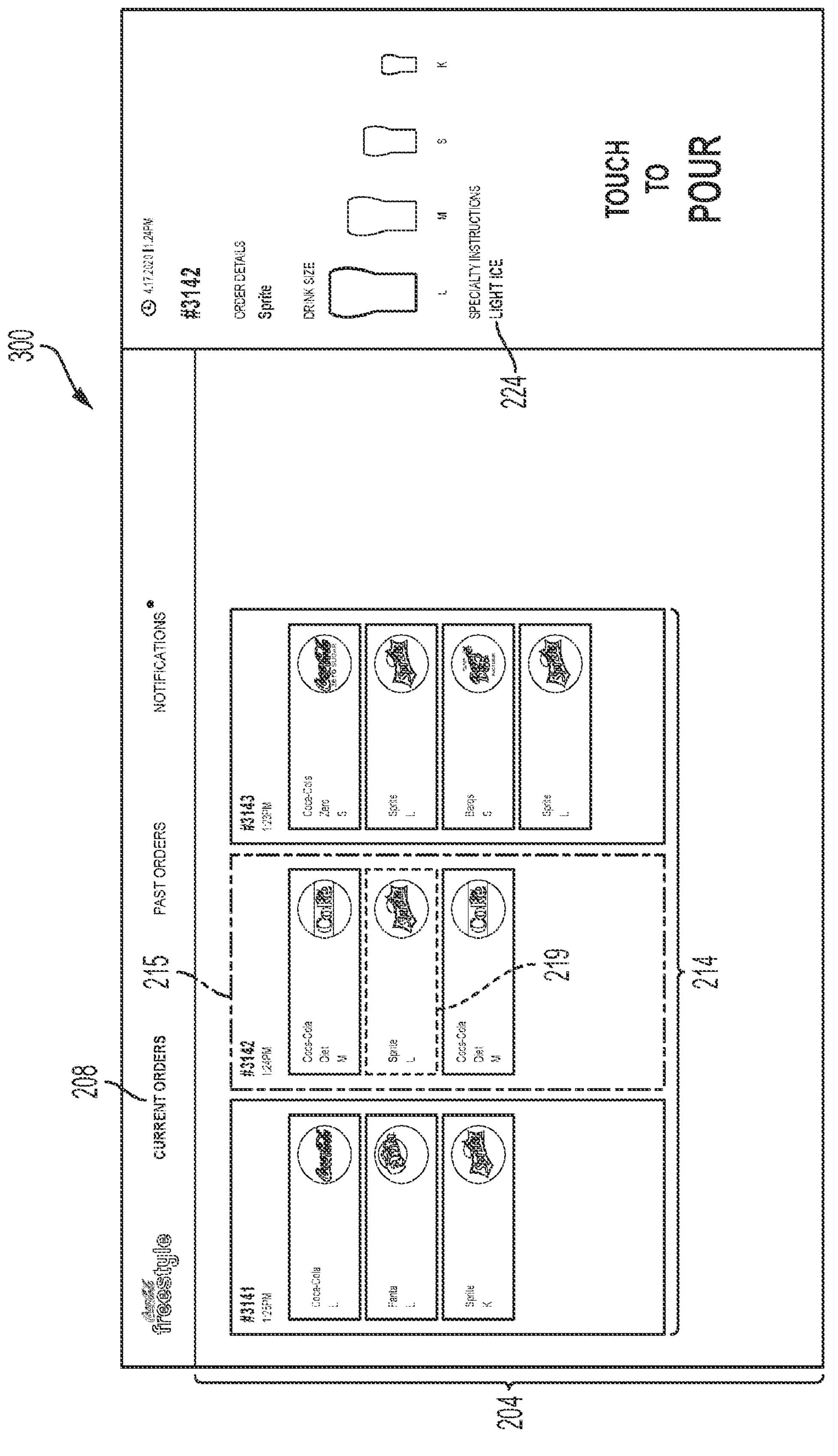
FIG. 3 illustrates an exemplary user interface with a second selected order and selected beverage with specialty instructions suitable for various embodiments of the disclosure.

FIG. 3 illustrates an exemplary screen 300 that may be displayed on the user interface 124. Like reference numerals represent like parts described above. In the example shown, a different currently selected order 215 and different currently selected beverage 219 are shown. Specifically, order #3142 is selected as opposed to order #3143 in the example of FIG. 2. The currently selected beverage 219 is also a Large SPRITE, but includes specialty instructions 224 instructing a crew member to fill the cup with light ice (e.g., less than a standard amount of ice). While a Large cup with a standard amount of ice weighs more than a Large cup with light ice, the cup detection algorithm is still able to predict the cup is a Large cup as indicated by the highlighted icon 222.

Figure 4:
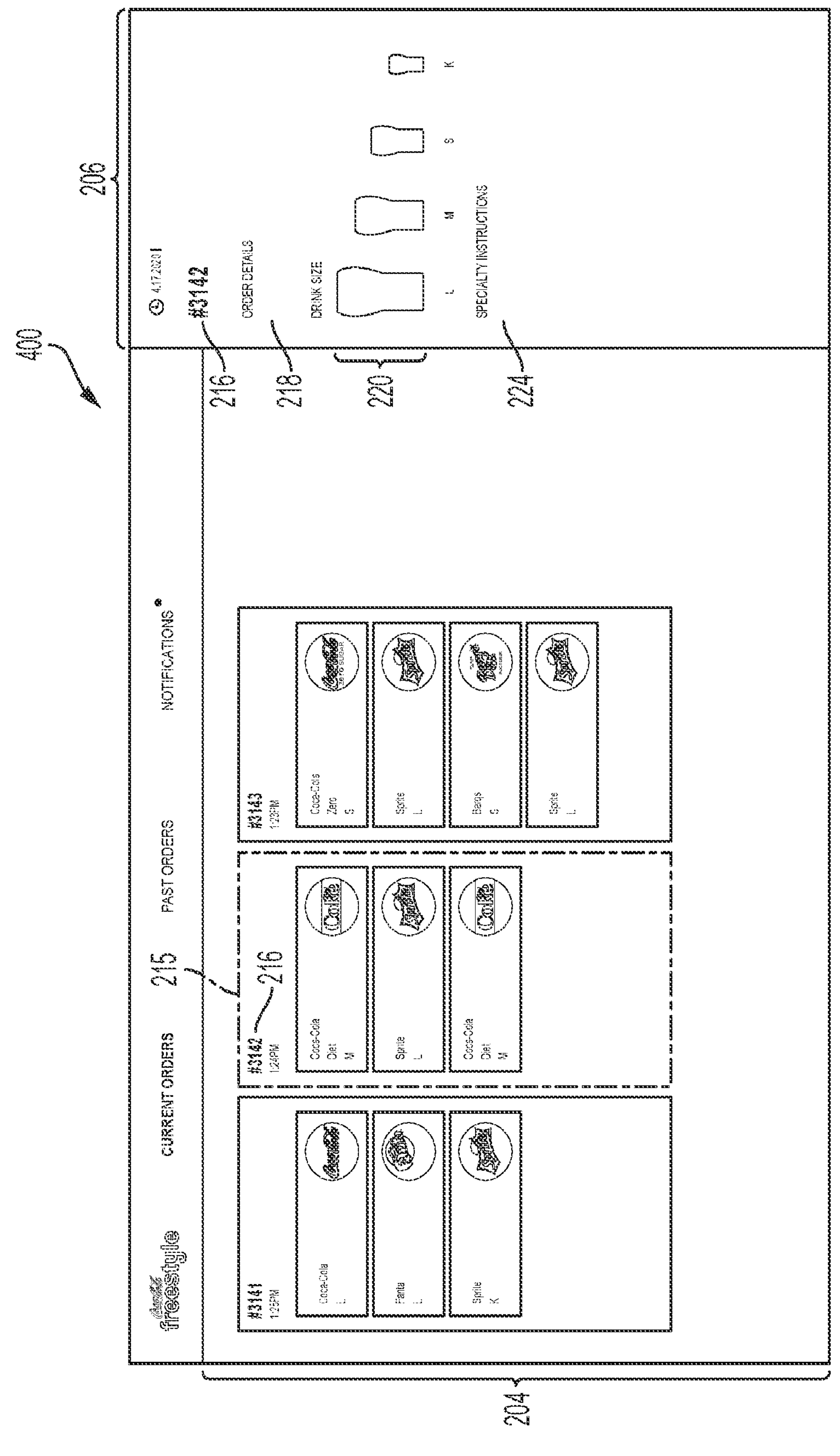
FIG. 4 illustrates another exemplary user interface prior to detection of a cup suitable for various embodiments of the disclosure.

FIG. 4 illustrates an exemplary screen 400 that may be displayed on the user interface 124 prior to detection of a cup suitable for various embodiments of the disclosure. Like reference numerals represent like parts described above. In the example shown, the currently selected order 215 is shown in the order area 204. Accordingly, the order ID 216 is shown in the beverage details area 206. However, as no beverage is selected, no beverage is shown in the beverage details area 206 nor are any specialty instructions 224 or the touch to pour icon 226. As shown in the cup size prediction area 220, none of the cup size icons is highlighted. Therefore, no cup has been detected by the beverage dispenser 122.

Figure 5:
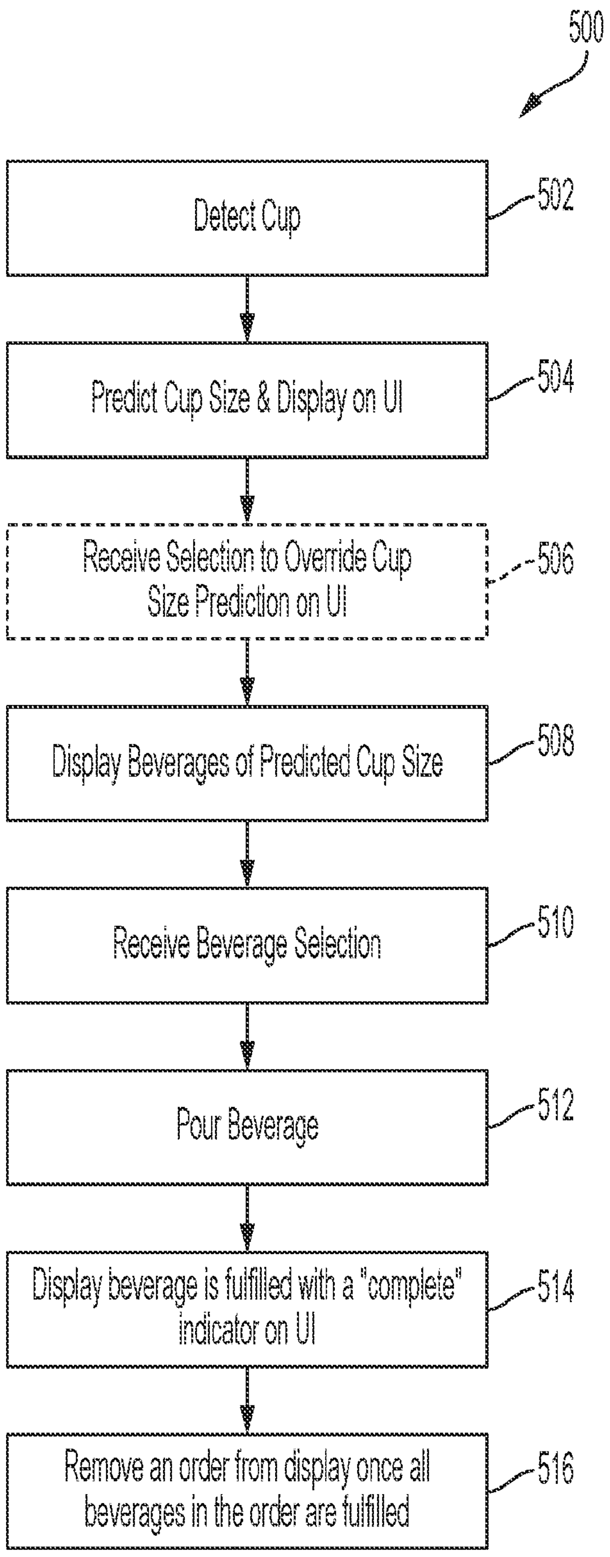
FIG. 5 illustrates a flowchart of an exemplary process suitable for various embodiments of the disclosure.

FIG. 5 illustrates a flowchart of an exemplary process 500 executed by the beverage dispenser 122 according to various embodiments of the disclosure. At 502, the beverage dispenser 122 detects a cup. For example, the APC assembly 130 may run a cup detection algorithm in response to a determination that the APC assembly 130 is empty (e.g., no cup is present on the APC assembly 130) based on measuring a stable zero mass or a stable mass close to zero (e.g., within a predetermined fraction of the lightest cup, such as masses less than or equal to 10%, 25%, or 50% of the lightest cup). The cup detection algorithm monitors mass readings from the APC assembly 130 until a measured mass stabilizes at a non-zero value (e.g., a non-zero value greater than a predetermined fraction of the lightest cup, such as a mass greater than or equal to 90% of the lightest cup). In some implementations, a mass is determined to be stable when fluctuations in a measurement of the mass are within a predetermined range of prior measurement(s) for a predetermined period of time (e.g., masses measured over a period of 500 ms are within 10% of each other). Other determinations of a stable measurement are contemplated by this disclosure.

At step 504, the beverage dispenser 122 predicts the cup size based on the measured mass using cup detection algorithms and displays the predicted cup size on the UI 124 (e.g., the corresponding cup size icon of the predicted cup size is shown with the highlighted icon 222 in the cup size prediction area 220). In some implementations, two different cup detection algorithms are used: one for detecting empty cups, and one for detecting cups with ice. In various implementations, both algorithms are used and a prediction with the smallest difference (relative or absolute, as discussed below) from an expected value is selected.

A first cup detection algorithm uses the measured mass to predict a cup size based on assuming the detected cup is empty. Based on a known mass of each cup available in the outlet (e.g., determined through a calibration or configuration of the beverage dispenser 122), the measured mass from the APC assembly 130 may simply be compared to the known list of cup masses using a match threshold to establish a valid range of values for each cup (e.g., within 5%, 10%, 20%. or other fraction of each known mass of each cup). Based on the match threshold, different sized cups may have overlapping ranges of valid masses. The match threshold is a configurable variable within the beverage dispenser 122 (e.g., emptyMatchTreshold). A preliminary cup size prediction is made that selects each cup size that is within the match threshold of the measured mass. The beverage dispenser 122 determines an absolute difference between the measured mass and a target mass of each of the selected cups and sorts the cups selected in the preliminary cup size prediction by the absolute difference. A cup size with the smallest absolute difference value is selected as the predicted cup size.

A second cup detection algorithm uses the measure mass to predict a cup size based on assuming the detected cup has ice. This is conceptually similar but a bit more complex since the amount of ice in the cup can vary significantly. To account for this, there is a setting called expectedIceFillPercent which indicates how full the crew is supposed to fill a cup at this particular outlet (e.g., the ice fill amount configuration discussed above). By using this fill percent, the density of ice and the volume of the cup, the typical mass of ice to expect in the cup is determined by:

$$m_{ice}=V_{cup}*\text{expectedIceFillPercent}*d_{ice}, \quad \text{Equation (1)}$$

where $m_{ice}$ is the expected mass of a cup when filled with an expected amount of ice at an outlet, $V_{cup}$ is a volume of the cup, and expectedIceFillPercent is an amount of the cup that is expected to be filled with ice by crew at the outlet (e.g., ¼ full, ½ full, ¾ full, full, etc.), and dice is the density of ice.

However, large variations may result based on the shape and size of ice used in the outlet, thereby impacting the packing density of the ice within the cup. For example, large ice leaves more gaps and thus a cup filled to the top may only be 70% full by mass. To account for this there is a calibration process that measures how much a cup mass when it is full of ice, $m_{fullIceGrams}$. For example, the beverage dispenser 122 may be configured with the calibrated $m_{fullIceGrams}$ value. Therefore, the typical mass of a cup containing ice is determined by:

$$m_{cupWithIce}=m_{cup}+(m_{fullIceGrams}*\text{expectedIceFillPercent}), \quad \text{Equation (2)}$$

where $m_{cupWithIce}$ is the expected mass of a cup when filled with an expected amount of ice at an outlet, $m_{cup}$ is the known mass of the cup, $m_{fullIceGrams}$ is the mass of the cup when full of ice at the outlet, and expectedIceFillPercent is an amount of the cup that is expected to be filled with ice by crew at the outlet (e.g., ¼ full, ½ full, ¾ full, full, etc.), and $d_{ice}$ is the density of ice.

When a cup is manufactured, there is some small variability in the mass of the cup. Generally speaking this variability is small and may be evenly distributed around the typical mass of a cup. However, when filling with ice it is very easy to under-fill the ice (e.g., put less than the expected amount of ice within the cup), especially for larger cups. Using an even distribution around the expected mass of a cup when filled with an expected amount of ice, then the measured value for larger cups under-filled with ice will overlap with smaller cups filled with the expected amount of ice. To account for this, a separate upper match threshold (e.g., upperIceMatchPercent) and lower match threshold (e.g., lowerIceMatchPercent) are used when comparing the measured mass from the APC assembly 130 to expected masses of cups with ice. The upper and lower match thresholds are expressed in terms of a percentage instead of an absolute mass, which allows for an automatic scaling of the valid mass range as the mass goes up, such as where larger cups have considerably more ice and thus larger variances in ice than smaller cups by mass.

The measured mass from the APC assembly 130 may be compared to the known list of cup masses with ice using the upper and lower match thresholds to establish a valid range of values for each cup. A preliminary cup size prediction is made that selects each cup size that is within the upper and lower match thresholds of the measured mass. The beverage dispenser 122 determines an absolute difference percentage between the measured mass and a target mass of each of the selected cups with ice and sorts the cups selected in the preliminary cup size prediction by the absolute difference percentage. A cup size with the smallest absolute difference percentage value is selected as the predicted cup size. Using the absolute difference percentage, as opposed to the absolute difference used in the first cup detection algorithm, has the effect of normalizing the values for each comparison. For example, an absolute difference of 5 grams on a small cup may be a larger absolute difference percentage than a 15 gram absolute difference on a large cup.

Running the first and second cup detection algorithms yields robust cup prediction in actual use. While the second cup detection algorithm may improperly predict a smaller cup in instances where a large cup is under filled with ice so that it matches the mass of the smaller cup being filled with ice, as described above, the predicted cup size is clearly displayed on the UI 124. At 506, a user may optionally override the predicted cup size by selecting a correct cup size, if desired (e.g., selecting a correct one of the cup size icons from the cup size prediction area 220). As a result of the first and second cup detection algorithms, the beverage dispenser 122 is able to identify the cup placed on the platform, determine whether the cup contains ice or not, and using the corresponding volume of the identified cup, compute the remaining volume in the cup, as described in more detail below. In various implementations, upon detecting that a cup is filled with an amount of ice other than the configured the ice fill amount (e.g., upon receiving a selection of a correct cup size), a notification may be displayed on the UI 124 to notify the crew member that they provided too little or too much ice.

In some implementations, as opposed to using the cup detection algorithms discussed above, a user may simply select a correct one of the cup size icons from the cup size prediction area 220 or select a beverage that has a size corresponding to a cup placed on the APC 130. In this implementation, a cup validation algorithm verifies whether measured mass of a cup placed on the APC assembly 130 is within a valid range for the selected cup size. For example, the cup validation algorithm verifies:

$$M_{empty}<M_{measured}<M_{full}, \quad \text{Equation (3)}$$

where $M_{empty}$ is an expected mass of the selected cup size, $M_{measured}$ is the measured mass of the cup placed on the APC 130, and $M_{full}$ is an expected mass of the selected cup size when full of ice and/or beverage. In implementations where the cup size is a selection input as opposed to the cup size prediction, one or more of 502-506 may be omitted.

At 508, the beverage dispenser 122 modifies the UI 124 to highlight the beverages 218 corresponding to the predicted cup size (e.g., highlights, circles, or otherwise emphasizes beverages 218 that correspond to the predicted cup size or grays out, hides, or otherwise de-emphasizes beverages 218 that do not correspond to the predicted cup size). At 510, the beverage dispenser 122 receives a selection for the currently selected beverage 219 that corresponds to the predicted cup size.

At 512, the beverage dispenser 122 pours the currently selected beverage 219 using one or more advanced portion control algorithms to fill a cup to a desired level regardless of whether the cup is contains a variable amount of ice and/or is partially full of liquid, or is empty.

The algorithm used by the beverage dispenser 122 based on the mass measurement detected by the APC assembly 130 is based on the known volume ($V_{cup}$) and mass ($m_{cup}$) of an empty cup placed on the APC assembly 130. The beverage dispenser 122 can simply pour the currently selected beverage 219 to fill the volume of the cup:

$$V_{pour}=V_{cup}, \quad \text{Equation (4)}$$

where $V_{pour}$ is the volume of the currently selected beverage 219 to be poured by the beverage dispenser 122, and $V_{cup}$ is the volume of the cup places on the APC assembly 130. It is rarely desired for the beverage dispenser 122 to pour all the way to the top of a cup, so a setting, fillPercent, configurable on the beverage dispenser for each cup size indicates how full the cup should be at the end of the pour. A typical value for the fill percent setting is 93% which leaves enough space to put a lid on the cup without pushing ice down and overflowing the cup. Other fill percent values may be used. The beverage dispenser 122 may dispense the currently selected beverage 219 until a dispensed volume is equal to the calculated volume to be pour, if the beverage dispenser 122 determines that a cup is overflowing based on the measure mass of the cup from the APC 130 not increasing, or if the beverage dispenser determines that a cup has been removed based on the measured mass of the cup from the APC 130 decreasing.

However, if the cup isn't empty, the beverage dispenser 122 accounts for the volume of the contents of the cup. For example, if the cup is partially full from a previous pour, but contains no ice, the beverage dispenser 122 knows the mass of the cup and contents as $m_{total}$ based on the mass measurement provided by the APC assembly 130. Based on the density of the beverage ($d_{bev}$), the beverage dispenser can compute the pour volume as:

$$m_{contents}=m_{total}-m_{cup}, \quad \text{Equation (5)}$$

$$V_{contents}=m_{contents}*d_{bev}, \quad \text{Equation (6)}$$

$$V_{pour}=V_{cup}-V_{contents}, \quad \text{Equation (7)}$$

where $m_{contents}$ is the mass of the contents of the cup, $m_{total}$ is the total mass of the cup and the contents of the cup as measured by the APC assembly 130, and is $m_{cup}$ the mass of the cup, such as a known mass of the cup determined based on the cup detection algorithms discussed above, $V_{contents}$ is the volume of the contents contained within the cup, $d_{bev}$ is the density of the beverage contents in the cup, $V_{cup}$ is the volume of the cup such as a known volume of the cup determined based on the cup detection algorithms discussed above, and $V_{pour}$ is the volume of the currently selected beverage 219 to be poured by the beverage dispenser 122 from the nozzle 126.

Equations 5-7 can also be used for a cup with ice by replacing $d_{bev}$ with the density of ice. It turns out that generally, the density of ice or water may be used in all cases without incurring significant error. The reason is because of the typical shape of a cup. A common paper cup is narrow at the bottom and wider at the top. This means that as the cup fills, a given increment in fill requires more volume. By the time the top of the cup is reached, the surface area is large enough that a few of grams of liquid will not significantly change the fill line. Because the major ingredient of every beverage is water and a typical cup is pre-filled with ice, the actual density difference of the other ingredients is negligible in actual use.

The beverage dispenser 122 may additionally dispense one or more top-offs to allow for foam to dissipate and ensure the cup is full of the currently selected beverage. An example of top-off configurations on the beverage dispenser and top-off operations is described in U.S. Pat. No. 9,227,830 to Angus et al., "Automated Beverage Dispensing System with Ice and Beverage Dispensing," granted on Jan. 5, 2016, hereby incorporated by reference in its entirety.

Almost as important as knowing how much volume to pour into a cup is knowing when to stop a pour. There are two common reasons to stop a pour before the calculated pour volume is reached. The first is because the cup is smaller than predicted and the beverage is overflowing the cup. The second is because the cup is removed from the APC assembly 130 prior to completing the pour. In both cases product is being dispensed by the beverage dispenser 122 and resulting in wasted product flowing down the drain. Accordingly, the beverage dispenser 122 includes stopping algorithms for determining when to abort a pour.

In a first stopping algorithm, the beverage dispenser 122 determines that the cup is smaller than predicted and the beverage is overflowing the cup. The beverage dispenser 122 monitors the mass of the cup over time during the pour, as measured by the APC assembly 130. Upon determining that a mass of the cup does not change more than a threshold amount over a predetermined time interval (e.g., 200 ms), the beverage dispenser 122 determines that the cup is no longer filling with additional liquid and hence is overflowing.

In a second stopping algorithm, the beverage dispenser 122 determines that the cup is no longer present on the APC assembly 130. The beverage dispenser 122 monitors the mass of the cup over time during the pour, as measured by the APC assembly 130. Upon determining that a mass of the cup reduces in mass (e.g., the APC assembly 130 measures a zero mass after having started the pour), the beverage dispenser determines that the cup is no longer present on the APC assembly 130.

At 514, the beverage dispenser 122 displays that the beverage is fulfilled with a "complete" indicator on the UI 124. For example, upon successfully filling the selected beverage 218 (e.g., no errors and cup not removed prematurely), the selected beverage 218 may be grayed out or otherwise have a distinctive appearance or accompanying icon (e.g., check mark) to indicate that the beverage 218 has been filled. At step 516, the beverage dispenser 122 removes an order from display on the UI 124 once all the beverages in the order are fulfilled.

Figure 6:
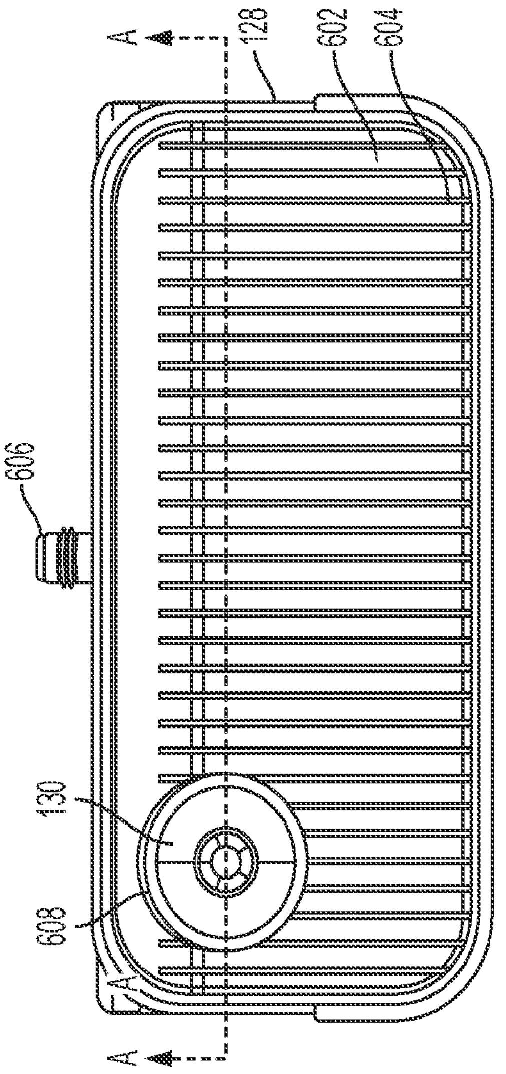
FIG. 6 illustrates a top down view of a drip tray with an automatic portion control (APC) assembly suitable for various embodiments of the disclosure.

FIG. 6 illustrates a top down view of the drip tray 128 with the APC assembly 130 according to various embodiments of the disclosure. The drip tray 128 comprises a tray cover 602 with one or more slots or openings therethrough to facilitate draining of liquids and ice from the beverage dispenser 122. The tray cover 602 is flat to allow for placement of a cup thereon without tipping. Fluids that flow through the tray cover 602 are routed to a drain 606 of the drip tray 128. The tray cover 602 is removable to allow a crew member to clean the drip tray 128. The tray cover 602 comprises a hole 608 sized to receive a portion of the APC assembly 130 therethrough. The APC assembly 130 is positioned on the tray cover 602 at a location under the nozzle 126. The APC assembly 130 is configured to receive a cup thereon. The APC assembly comprises a mass sensor configured to measure a mass of a cup placed thereon for use in the cup detection and advanced portion control algorithms described above.

Figure 7:
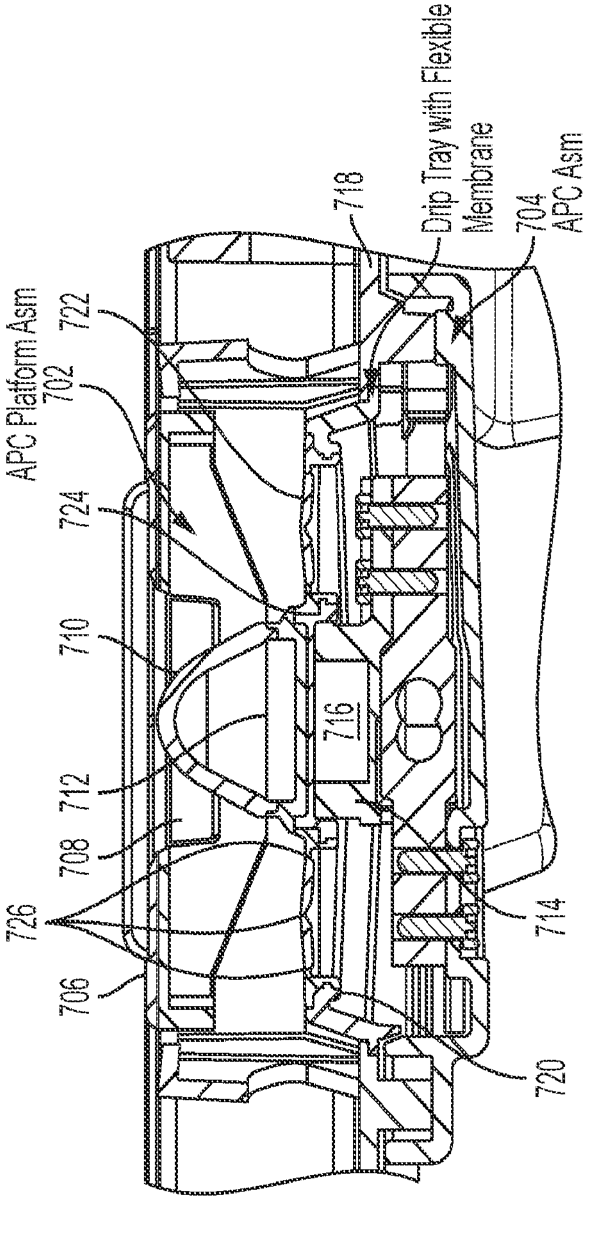
FIG. 7 illustrates a cross-sectional view of the APC assembly about the line A-A in FIG. 6.

FIG. 7 illustrates a cross-sectional view of the APC assembly 130 about the line A-A in FIG. 6. The APC assembly 130 comprises a platform assembly 702 and a mass sensor assembly 704. The platform assembly 702 comprises a cup rest 706, a central fluid diverter 710, and a drain 708. In the example shown, the drain 708 circumferentially surrounds the central fluid diverter 710. Excess fluids from spills, drips, or over-pours of a beverage flow down the cup rest 706, through the drain 708, and/or over the fluid diverter 710 and flow front to back to the drip tray 128 and on to the drain 606. Accordingly, fluid buildup on the APC assembly 130 is prevented, thereby ensuring accurate readings by the mass sensor. A magnetic insert 712 is contained within the central fluid diverter 710, such as a steel insert or other ferrous material.

The mass sensor assembly 704 comprises a magnet holder 714 with a magnet 716 positioned therein. The magnet 716 is positioned to align with the magnetic insert 712 of the central fluid diverter 710. Accordingly, the magnet 716 removably holds the platform assembly 702 to the mass sensor assembly 704 via the magnetic insert 712. Therefore, the platform assembly 702 may be periodically removed from the beverage dispenser 122 for cleaning the platform assembly 702 and providing access to clean the drip tray 128.

A base 718 of the drip tray 128 comprises a hole 720 sized to receive a portion of the mass sensor assembly 704. The hole 720 in the base 718 of the drip tray 128 is aligned with the hole 608 of the tray cover 602. A fluid tight membrane 722 spans the hole 720 between the base 718 and the magnet holder 714 to ensure that fluids are not able to travel to come into contact with the mass sensor assembly 704. The fluid tight membrane 722 is a flexible membrane with one or more circumferential grooves 726 thereon to facilitate vertical displacement without negatively impacting the sensitivity of the mass sensor assembly 704. In various implementations, the membrane 722 comprises a central cap 724 positioned to be placed between the magnet 716 and the magnetic insert 712, thereby reducing wear to the membrane 722. In various implementations, the central cap 724 is a hard plastic with one or more features for seating the magnet holder 714 and the central fluid diverter 710 to ensure proper alignment between the magnet 716 and the magnetic insert 712.

While the example described above uses the magnetic insert 712 and the magnet 716 for centering and coupling the platform assembly 702 to the mass sensor assembly 704, other coupling mechanisms are contemplated by this disclosure, such as a twist-to-lock feature, screws, bolts, or other removable coupling mechanism know to those of ordinary skill in the art.

Figure 8:
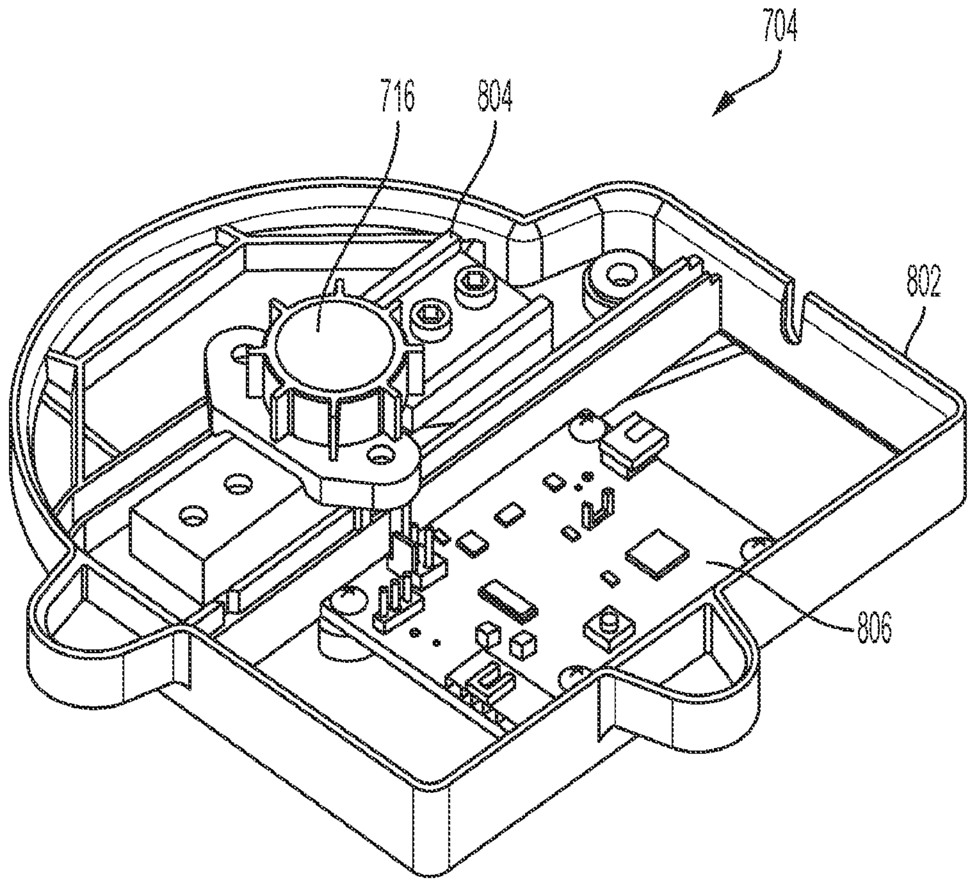
FIG. 8 illustrates an isometric internal view of a mass sensor assembly of the APC assembly suitable for various embodiments of the disclosure.
Figure 9:
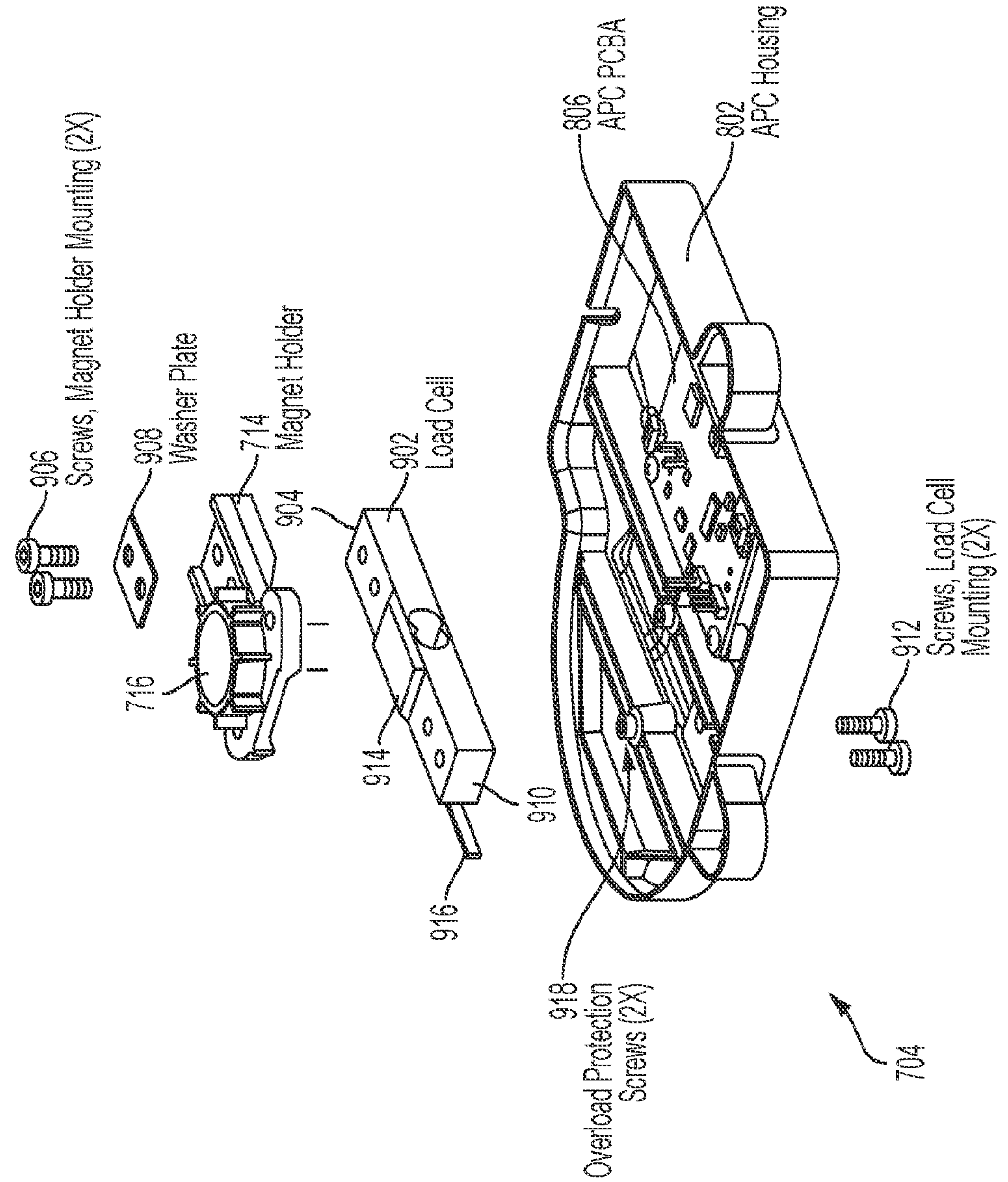
FIG. 9 illustrates an exploded view of the mass sensor assembly in FIG. 8.

FIG. 8 illustrates an isometric internal view of the mass sensor assembly 704 of the APC assembly 130 suitable for various embodiments of the disclosure. FIG. 9 illustrates an exploded view of the mass sensor assembly 704 in FIG. 8. The mass sensor assembly 704 comprises a housing 802, a load cell assembly 804, and a printed circuit board assembly (PCBA) 806.

The load cell assembly 804 comprises a load cell 902 coupled to the magnet holder 714. In the example shown, the magnet holder 714 is affixed to a first end 904 of the load cell 902 via one or more screws 906 and a washer 908. The housing 802 is coupled to a second end 910 of the load cell 902 via one or more screws 912. The first end 904 of the load cell 902 is opposite from the second end 910 about a longitudinal direction of the load cell 902. Accordingly, the load cell 902 is cantilevered from the housing 802 such that loads applied to the magnet holder 714 work to displace the first end 904 of the load cell 902. Overload protection studs 918 extend from the housing 802 to prevent displacement of the first end 904 by more than a predetermined distance. In the example shown, the overload protection studs 918 are screws that extend from the housing.

One or more strain gauges 914 are positioned on the load cell 902 between the first and second ends 904, 910, such as at a center of the load cell 902. In the example shown, two strain gauges 914 are used on sides of the load cell 902 in a direction of and opposite to the direction of displacement of the first end 904 of the load cell 902. The strain gauges 914 comprise one or more wires 916 electrically connected to the PCBA 806 for generating a measurement of a mass of a cup placed on the cup rest 706. The PCBA 806 is in electrical communication with a controller of the beverage dispenser 122 for use in the cup detection and portion control dispense algorithms described above. While the PCBA 806 is shown as being located within the housing 802, in various implementations, the PCBA 806 may be located elsewhere within or external to the beverage dispenser 122.

While the mass sensor assembly 704 is described above with a load cell for measuring a mass of a cup placed on the APC assembly 130, other mass sensors other than load cells are contemplated by this disclosure, such as a capacitance, hydraulic, or pneumatic mass sensor.

Figure 10:
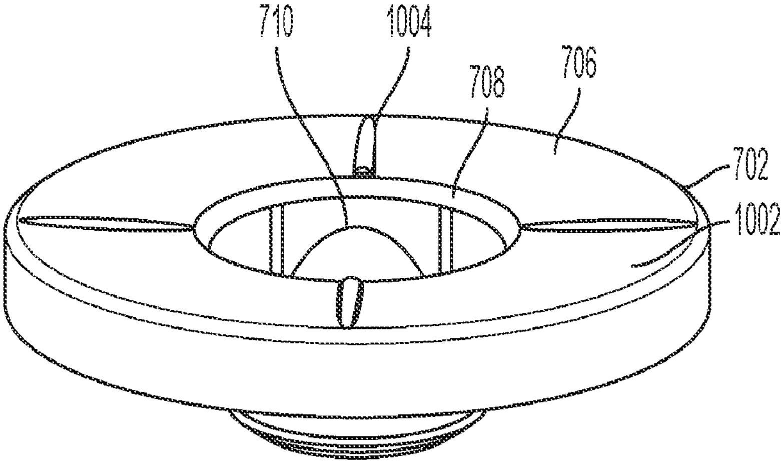
FIG. 10 illustrates a platform assembly of the APC assembly suitable for various embodiments of the disclosure.
Figure 11:
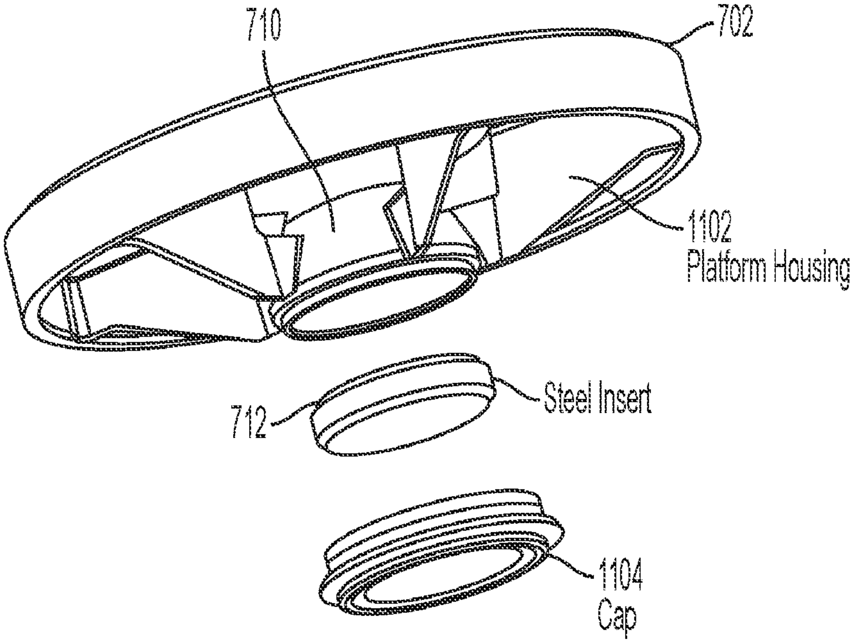
FIG. 11 illustrates an exploded view of the platform assembly suitable for various embodiments of the disclosure.

FIG. 10 illustrates the platform assembly 702 of the APC assembly 130 suitable for various embodiments of the disclosure. FIG. 11 illustrates an exploded view of the platform assembly 702 suitable for various embodiments of the disclosure. The platform assembly 702 comprises a platform housing 1102, the magnetic insert 712, and a cap 1104. The cap 1104 retains the magnetic insert 712 within the platform housing 1102. The platform housing 1102 comprises the cup rest 706, the central fluid diverter 710, and the drain 708, described above with reference to FIG. 7. The cup rest 706 comprises a slanted surface 1002 that is tilted towards the drain 708 and a plurality of ridges 1004. In the example shown, four ridges 1004 are provided. In some implementations, more or fewer ridges 1004 may be used. In some implementations, ridges 1004 may be provided about the entirety of the circumference of the slanted surface 1002. The ridges 1004 raise a base of a cup placed upon the cup rest 706 above the slanted surface 1002 such that fluid can flow between the based of the cup and the slanted surface 1002. Additionally, the ridges 1004 are tapered in an amount opposite to the slant on of the slanted surface, but in an opposite direction. Accordingly, the ridges 1004 are not sloped and provide a flat surface upon which to rest a cup. For example, the ridges 1004 are thickest at the drain 708 and taper toward an edge of the cup rest 706. Therefore, a cup placed upon the cup rest 706 may be maintained in a flat orientation despite the slanted surface 1002.

While the cup rest 706 is described with the slanted surface 1002 and the ridges 1004, other configurations of the cup rest 706 are contemplated by this disclosure. For example, rather than ridges, one or more grooves may be placed on the slanted surface 1002 and direct fluid towards the drain 708.

Figure 12:
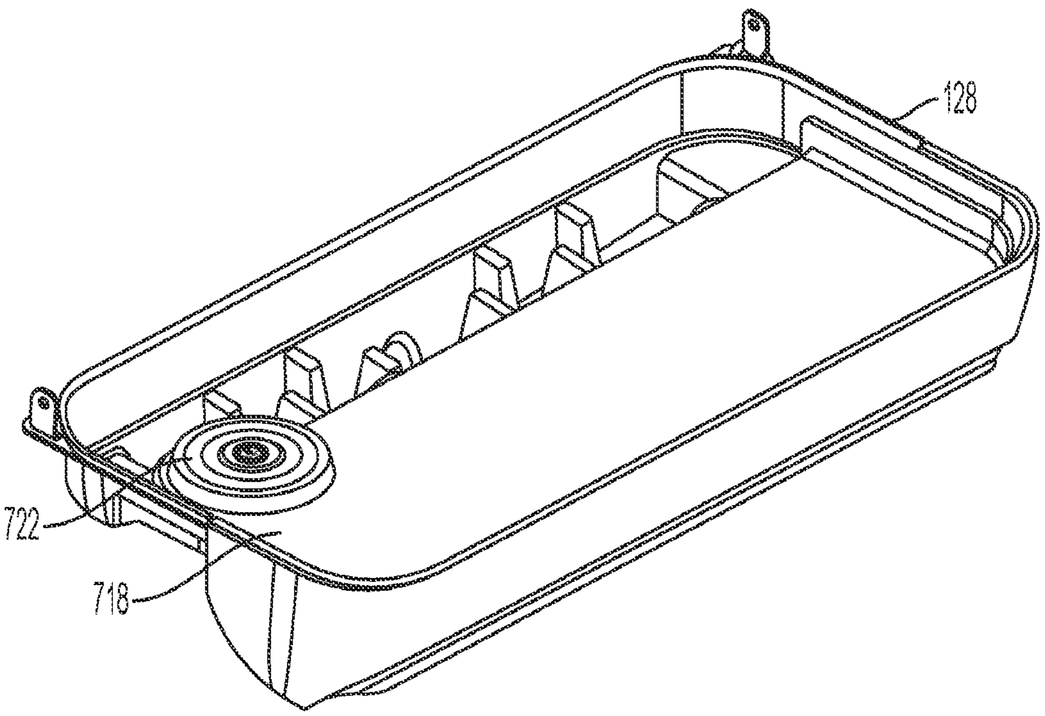
FIG. 12 illustrates a base of the drip tray suitable for various embodiments of the disclosure.
Figure 13:
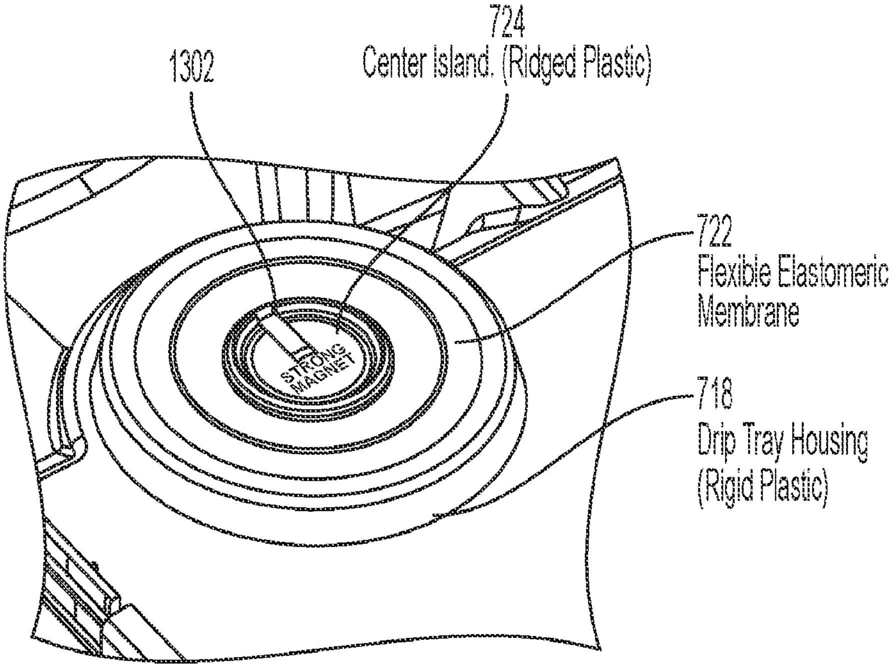
FIG. 13 illustrates a magnified view of the base of the drip tray of FIG. 12.

FIG. 12 illustrates the base 718 of the drip tray 128 suitable for various embodiments of the disclosure. FIG. 13 illustrates a magnified view of the base 718 of the drip tray 128 of FIG. 12. The cap 724 of the membrane 722 has a slot 1302 to facilitate liquid drainage from the cap 724 to the membrane 722 and on to the drain 606.

Figure 14:
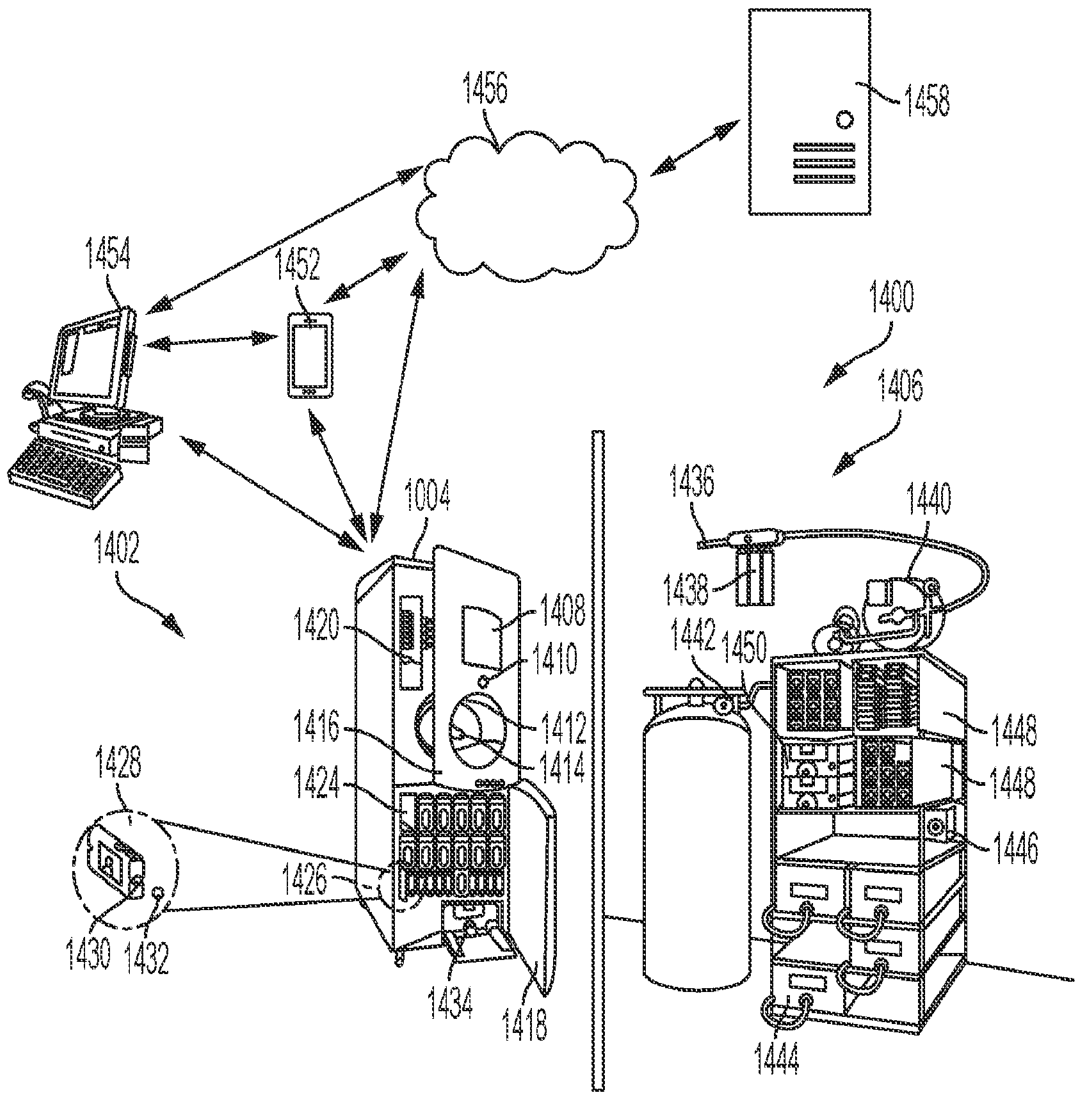
FIG. 14 illustrates an exemplary beverage dispenser system suitable for implementing the several embodiments of the disclosure.

FIG. 14 illustrates an exemplary beverage dispenser system 1400 suitable for implementing the several embodiments of the disclosure. For example, the beverage dispenser

122 may be implemented as the beverage dispenser system 1400. As shown, the beverage dispenser system 1400 is configured as an ice cooled beverage dispenser. Other configurations of beverage dispensers are contemplated by this disclosure such as a drop-in ice-cooled beverage dispenser, a counter electric beverage dispenser, a remote recirculation beverage dispenser, or any other beverage dispenser configuration.

The beverage dispenser system 1400 includes a front room system 1402 with a beverage dispenser 1404 and a back room system 1406. The beverage dispenser 1404 includes a user interface 1408, such as a touchscreen display, to facilitate selection of the beverage to be dispensed. The user interface 1408 may employ various screens to facilitate user interactions on the beverage dispenser 1404 and/or receive a user profile through interaction with a user's mobile device 1452, such as described in commonly owned U.S. patent application Ser. No. 14/485,826, entitled "Product Categorization User Interface for a Dispensing Device," which is herein incorporated by reference in its entirety.

Upon receiving a beverage selection via the user interface 1408, a pour button 1410 may be activated to dispense the selected beverage from the beverage dispenser 1404 via a nozzle 1414. For example, the pour button 1410 may be an electromechanical button, capacitive touch button, or other button selectable by a user to activate the beverage dispenser 1404 to dispense a beverage. While shown as a button, the pour button 1410 may alternatively be implemented as a lever or other mechanism for activating the beverage dispenser 1404 to dispense a beverage. As shown in FIG. 14, the pour button 1410 is separate from the user interface 1408. In some implementations, the pour button 1410 may be implemented as a selectable icon in the user interface 1408.

In some implementations, the beverage dispenser may also include an ice lever 1414. Upon being activated, the ice lever 1414 may cause the beverage dispenser 1404 to dispense ice through an ice chute (not shown). For beverage dispensers that do not have an ice bin, such as counter-electric or remote recirculation beverage dispensers, the ice lever 1414 may be omitted.

The beverage dispenser 1404 may be secured via a primary door 1416 and an ingredient door 1418. The primary door 1416 and the ingredient door 1418 may be secured via one or more locks. In some implementations, the locks are a lock and key. In some implementations, the lock on the ingredient door 1418 may be opened via an RFID reader (not shown) reading an authorize ingredient package 1428. The primary door 1416 may secure electronic components of the beverage dispenser 1404 including one or more controllers 1420. The ingredient door 1418 may secure an ingredient compartment that houses an ingredient matrix 1424.

The ingredient matrix 1424 includes a plurality of slots 1426 for receiving ingredient packages 1428. In various implementations, the ingredient packages 1428 may be micro-ingredient cartridges. The micro-ingredient cartridges may be single cartridges or double cartridges, such as described in commonly owned U.S. patent application Ser. No. 14/209,684, entitled "Beverage Dispenser Container and Carton," and U.S. patent application Ser. No. 12/494,427, entitled "Container Filling Systems and Methods," which are both herein incorporated by reference in their entirety. As shown in FIG. 14, there are three drawers of ingredients in the ingredient matrix 1424. One or more of the drawers may slide back and forth along a rail so as to periodically agitate the ingredients housed on the drawer. Other configurations of the ingredient matrix 1424 are possible, such as via one or more static and/or agitated ingredient towers.

Each ingredient package 1428 may comprise an RFID tag, a fitment 1430, and a fitment seal 1432. The fitment seal 1432 may be removed prior to installation into the beverage dispenser 1404. Upon installation, the fitment 1430 may engage with and provide a fluidic communication between a probe (not shown) in the slot 1426 and the ingredients contained in the ingredient package 1428. The ingredient matrix 1424 may also contain one or more large volume micro-ingredient packages 1434, such as for one or more micro-ingredient sweetener sources.

The beverage dispenser 1404 may also include a carbonator (not shown) for receiving water and carbon dioxide to produce carbonated water. The beverage dispenser 1404 may also include one or more heat exchangers (not shown), such as a cold plate, for cooling one or more of the beverage ingredients contained in or received by the beverage dispenser 1404. In some implementations, one or more of the micro-ingredients dispensed via the nozzle 1412 are not cooled via the heat exchanger or are otherwise maintained at an ambient temperature. Macro-ingredients dispensed via the nozzle 1412 are typically cooled via the heat exchanger prior to being dispensed.

The back room system 1406 is typically located in a back room remote from the front room system 1402, such as a storage area in a merchant location. The back room system 1406 includes a water source 1436 such as a municipal water supply that provides a pressurized source of plain water. The water received via the water source 1436 may be filtered or otherwise treated by a water treatment system 1438. The treated water may optionally be pressurized to a desired pressure with a water booster 1440 and supplied to the beverage dispenser. A carbon dioxide source 1442 may supply carbon dioxide to the beverage dispenser 1404.

One or more macro-ingredient sources 1444 may be located in the back room. The macro-ingredient from each macro-ingredient source 1444 may be supplied to the beverage dispenser 1404 via a pump 1446. The pump 1446 may be a controlled gear pump, diaphragm pump, BIB pump, or any other suitable pump for supplying macro-ingredients to the beverage dispenser 1404. The back room system 1406 may also include a rack with one or more storage locations 1448 for spare micro-ingredients and one or more storage locations 1450 for spare macro-ingredients.

The beverage dispenser 1404 may include one or more network interfaces for communicating directly with devices in the front room or the back room, communicating with devices in the front room or the back room in a local area network (LAN), or communicating with devices remote from a location with the beverage dispenser system 1400 via a wide area network (WAN) connection. For example, the beverage dispenser 1404 may include networking devices such as a near field communication (NFC) module, a BLUETOOTH module, a WiFi module, a cellular modem, an Ethernet module, and the like. The beverage dispenser 1404 may communicate via a direct communication or via a LAN with a user's mobile device 1452 or a point-of-sale (POS) device 1454 to receive a beverage selection or user profile of a user for configuring the beverage dispenser 1404 to dispense one or more beverages based on the beverage selection or user profile. The user profile may include stored favorite beverages for the user, mixed or blended beverages created or stored by the user in their profile, and/or one or more beverage preferences, such as preferred nutritive level. The beverage dispenser 1404 may also communicate via a WAN 1456 for communicating with one or more remote servers 1458 to receive software updates, content updates, user profiles, or beverage selections made via the remote server 1458.

Figure 15:
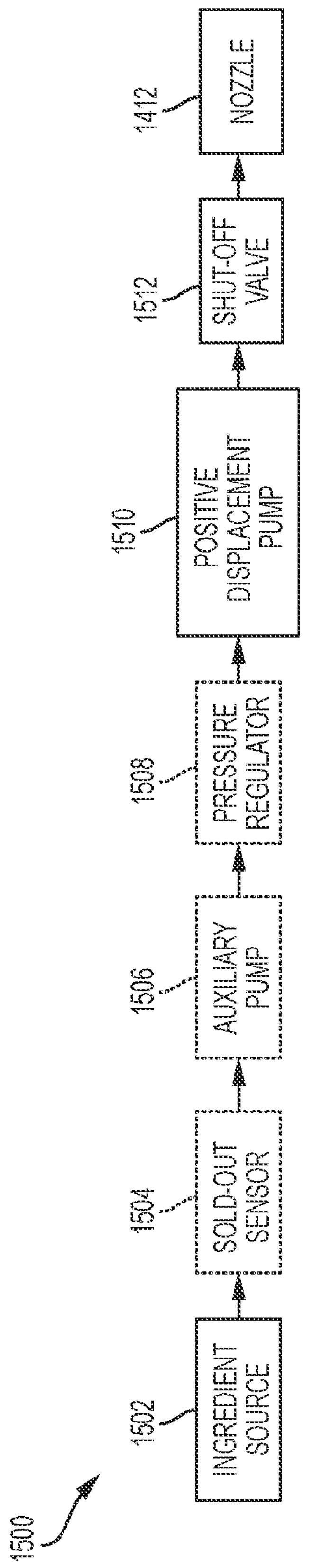
FIG. 15 illustrates an exemplary fluidic circuit with a positive displacement pump suitable for implementing the several embodiments of the disclosure.
Figure 16:
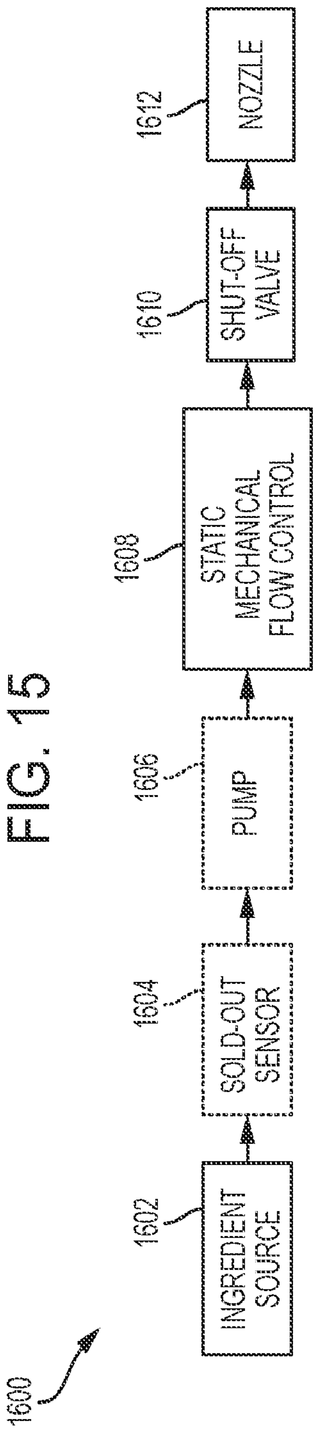
FIG. 16 illustrates an exemplary fluidic circuit with a static mechanical flow control suitable for implementing the several embodiments of the disclosure.
Figure 17:
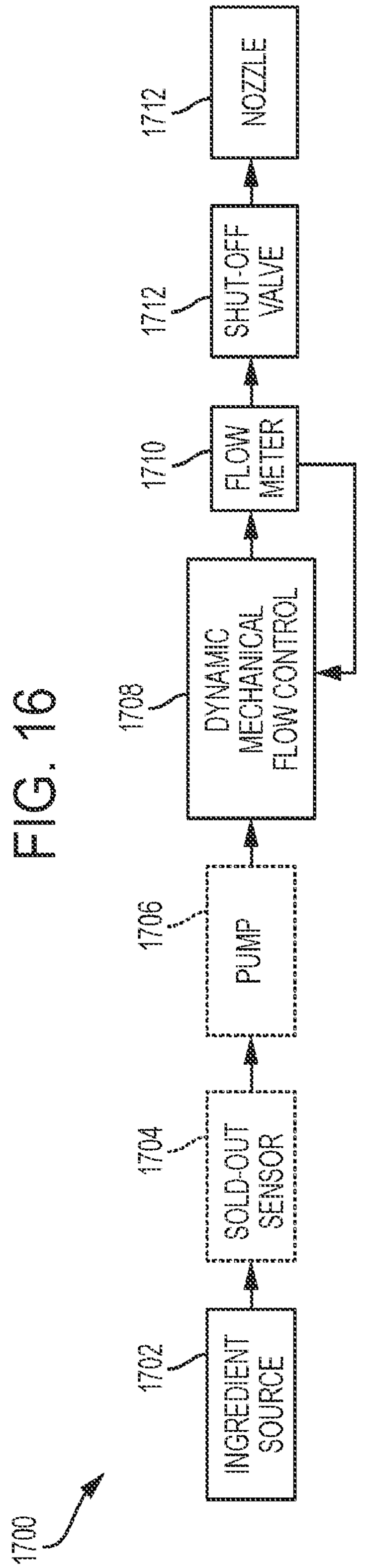
FIG. 17 illustrates an exemplary fluidic circuit with a dynamic mechanical flow control and flow meter suitable for implementing the several embodiments of the disclosure.

FIGS. 15-17 illustrate exemplary fluidic circuits 1500-11600 with pumping or metering devices from ingredient sources 1502, 1602, 1702 to the nozzle 1412 of the beverage dispenser 1404. The beverage dispenser 1404 may include none, one, or a plurality of the fluidic circuits shown in FIGS. 6-8. For each ingredient source, the beverage dispenser 1404 may include one of the fluidic circuits shown in FIGS. 6-8. For example, each of the pumping or metering devices 108, 110, 112 may be implemented as one of the fluidic circuits shown in FIGS. 6-8.

FIG. 15 illustrates an exemplary fluidic circuit 1500 with a positive displacement pump 1510 suitable for implementing the several embodiments of the disclosure. The fluidic circuit 1500 provides a fluid path from the ingredient source 1502 to the nozzle 1412. The ingredient source 1502 may be a micro-ingredient source or a macro-ingredient source housed in the ingredient matrix 1424 of the beverage dispenser 1404, remote from the beverage dispenser 1404 in the front room (e.g., adjacent to the beverage dispenser 1404 or under a counter on which the beverage dispenser 1404 is located), or located in the back room. The positive displacement pump 1510 may meter a predetermined volume or flow rate of ingredient from the ingredient source 1502 to the nozzle 1412. The positive displacement pump 1510 may be a piston pump, controlled gear pump, peristaltic pump, nutating pump, diaphragm pump, or other such positive displacement pump for metering a fixed volume of flow rate of a fluid with each cycle of the pump.

The fluidic circuit 1500 may optionally include a sold-out sensor 1404 for detecting when the ingredient source 1502 is empty. When the ingredient source 1502 is remotely located from the beverage dispenser 1404, the fluidic circuit 1500 may also optionally include an auxiliary pump 1506 for providing a pressurized supply of the beverage ingredient to the beverage dispenser 1404. Within or immediately adjacent to the beverage dispenser 1404, the fluidic circuit 1500 may include a pressure regulator 1508 such that the inlet of the positive displacement pump 1510 receives a lower or zero pressure supply of beverage ingredient. The fluidic circuit 1500 may also optionally include a shut-off valve 1412 that is configured to remain closed when an ingredient is not being dispensed so as to prevent beverage ingredient from dripping from the nozzle 1412.

FIG. 16 illustrates an exemplary fluidic circuit 1600 with a static mechanical flow control 1608 suitable for implementing the several embodiments of the disclosure. The static mechanical flow control 1608 receives a pressurized beverage ingredient from an ingredient source 1602 and provides a fixed flow rate of the beverage ingredient to the nozzle 1412. The static mechanical flow control 1608 may be calibrated with a set screw for configuring the flow rate of the static mechanical flow control 1608. A shut-off valve 1610 downstream of the static mechanical flow control 1608 may be actuated to open and close in order to dispense or prevent dispensing the beverage ingredient from the nozzle 1412.

The ingredient source 1602 may be a micro-ingredient source or a macro-ingredient source housed in the ingredient matrix 1424 of the beverage dispenser 1404, remote from the beverage dispenser 1404 in the front room (e.g., adjacent to the beverage dispenser 1404 or under a counter on which the beverage dispenser 1404 is located), or located in the back room. The ingredient source 1602 may also be the municipal water supply 536 or other pressurized ingredient source. When the ingredient source 1602 is not pressurized, the fluidic circuit 1600 may include a pump 1606 for pressurizing the beverage ingredient from the ingredient source 1602. The pump 1606 may be any pump suitable for pressurizing the beverage ingredient from the ingredient source 1602, such as a BIB pump, $CO_2$ driven pump, controlled gear pump, or positive displacement pump. The fluidic circuit 1600 may also optionally include a sold-out sensor 1604 for detecting when the ingredient source 1602 is empty.

FIG. 17 illustrates an exemplary fluidic circuit 1700 with a dynamic mechanical flow control 1708, a flow meter 1710, and a shut-off valve 1712 suitable for implementing the several embodiments of the disclosure. The dynamic mechanical flow control 1708 receives a pressurized beverage ingredient from an ingredient source 1702 and provides an adjustable flow rate of the beverage ingredient to the nozzle 1412. The dynamic mechanical flow control 1708 may include a variable sized orifice that adjusts to dynamically change the flow rate of the beverage ingredient supplied to the nozzle 1412 based on control signals provided by the one or more controllers 520. A flow meter 1710 downstream of the dynamic mechanical flow control 1708 measures a flow rate of the beverage ingredient being supplied by the dynamic mechanical flow control 1708 and provides a feedback loop to the dynamic mechanical flow control 1708 for controlling the variable sized orifice. A shut-off valve 1712 downstream of the dynamic mechanical flow control 1708 may be actuated to open and close in order to dispense or prevent dispensing the beverage ingredient from the nozzle 1412.

The ingredient source 1702 may be a micro-ingredient source or a macro-ingredient source housed in the ingredient matrix 1424 of the beverage dispenser 1404, remote from the beverage dispenser 1404 in the front room (e.g., adjacent to the beverage dispenser 1404 or under a counter on which the beverage dispenser 1404 is located), or located in the back room. The ingredient source 1702 may also be the municipal water supply 536 or other pressurized ingredient source. When the ingredient source 1702 is not pressurized, the fluidic circuit 1700 may include a pump 1706 for pressurizing the beverage ingredient from the ingredient source 1702. The pump 1706 may be any pump suitable for pressurizing the beverage ingredient from the ingredient source 1702, such as a BIB pump, $CO_2$ driven pump, controlled gear pump, or positive displacement pump. The fluidic circuit 1700 may also optionally include a sold-out sensor 1704 for detecting when the ingredient source 1702 is empty.

While the components of the fluidic circuits 1500-11600 are shown in a particular order in FIGS. 15-17, any order of the components described above may be used. For example, the shut-off valve 1712 may be upstream of the flow meter 1710. Other variations are readily recognizable by those of ordinary skill in the art. Additionally, one or more heat exchangers (not shown) may be used at any location in the fluidic circuits of FIGS. 15-17. The heat exchanger may include an ice bin, water bath, cold plate, or remote recirculation system.

Figure 18:
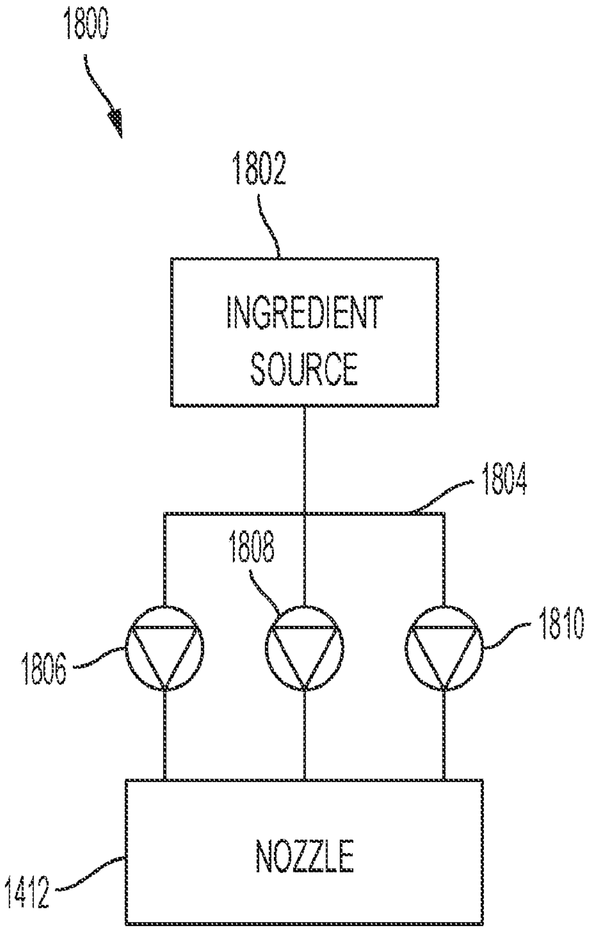
FIG. 18 illustrates an exemplary fluidic circuit with a plurality of independently controlled paths from a single ingredient source suitable for implementing the several embodiments of the disclosure.

FIG. 18 illustrates an exemplary fluidic circuit 1800 with a plurality of independently controlled paths from a single ingredient source 1802 to the nozzle 1412 suitable for implementing the several embodiments of the disclosure. The fluidic circuit 1800 includes a manifold 1804 for supplying beverage ingredient to each of the independently controlled paths. Each path includes a pumping or metering device 1806, 1808, 1810 for supplying beverage ingredient from the ingredient source 1802 to the nozzle 1412. The pumping or metering devices 1806, 1808, 1810 may be configured as any of the fluidic circuits 1500-1700 shown in FIGS. 15-17. By having multiple independent paths from the ingredient source 1802 to the nozzle 1412, a larger range of flow rates are possible than using any one of the pumping or metering devices 1806, 1808, 1810. For example, for a first flow rate of beverage ingredient from the ingredient source, only one of the pumping or metering devices 1806, 1808, 1810 may be activated. For a second flow rate of the beverage ingredient from the ingredient source, a plurality of the pumping or metering devices 1806, 1808, 1810 may be activated.

Figure 19:
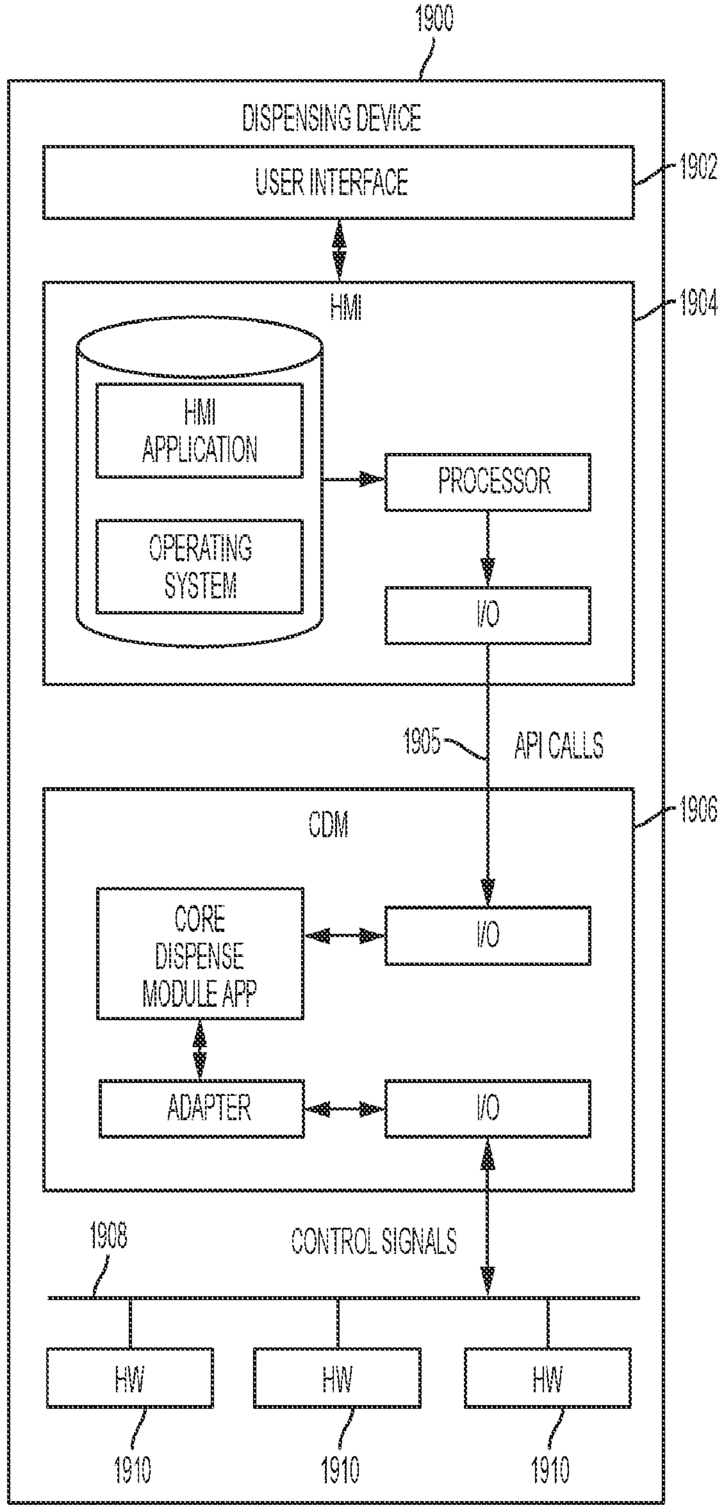
FIG. 19 illustrates an exemplary block diagram of a control architecture for a beverage dispenser suitable for implementing the several embodiments of the disclosure.

FIG. 19 illustrates an exemplary block diagram of a control architecture 1900 that may be used to control the beverage dispenser 1404 suitable for implementing the several embodiments of the disclosure. As shown in FIG. 19, control architecture 1900 may comprise a core dispense module (CDM) 1906, a human machine interface (HMI) module 1904, a user interface (UI) 1902, and a machine bus (MBUS) 1005. HMI 1904 may connect to or otherwise interface and communicate with at least one external device (e.g., mobile device 1452 or POS 1454) being external to beverage dispenser 1404. HMI 1904 may also control and update display screens on UI 1902. CDM 1906 may control flows from a plurality of pumps and/or valves 1910 in beverage dispenser 1404 according to a recipe to mix and dispense a product (e.g., a beverage) from beverage dispenser 1404.

Beverage ingredients (e.g., micro-ingredients, macro-ingredients, and/or diluents) may be combined to dispense various products that may include beverages or blended beverages (i.e., finished beverage products) from beverage dispenser 1404. However, beverage dispenser 1404 may also be configured to dispense beverage components individually.

An example of control architecture 1900 for beverage dispenser 1404 may be described in U.S. Ser. No. 61/987,020, entitled "Dispenser Control Architecture", filed on May 1, 2014, the entirety of which is hereby incorporated by reference. MBUS 1005 may facilitate communication between HMI 1904 and CDM 1906 via one or more API calls. HMI 1904, MBUS 1005, and CDM 1906 may collectively comprise common core components, implemented as hardware or as combination of hardware and software, which may be adapted to provide customized functionality in beverage dispenser 1404. Beverage dispenser 1404 may further include memory storage and a processor. Examples of UI 1902 may be described in U.S. Ser. No. 61/877,549, entitled "Product Categorization User Interface for a Dispensing Device", filed on Sep. 13, 2013, the entirety of which is hereby incorporated by reference.

UI 1902 may detect what area of a touch screen has been touched by a user (e.g., user 108). In response, UI 1902 may send HMI 1904 data regarding where the touch screen was touched. In response, HMI 1904 may interpret this received data to determine whether to have UI 1902 display a different UI screen or to issue a command to CDM 1906. For example, HMI 1904 may determine that the user touched a portion of the touch screen corresponding to a beverage brand. In response, HMI 1904 may issue a command to CDM 1906 to pour the corresponding beverage brand. In response to receiving the command to pour the corresponding beverage brand, the CDM 1906 in turn issues commands via one or more control buses 1908 to the pumping or metering devices 1910 for the beverage ingredients needed to dispense the beverage brand. Or HMI 1904 may determine that the user touched a portion of the touch screen corresponding to a request for another screen. In response, HMI 1904 may cause UI 1902 to display the requested screen.

In some embodiments, UI 1902 in beverage dispenser 1404 may be utilized to select and individually dispense one or more beverages. The beverages may be dispensed as beverage components in a continuous pour operation whereby one or more selected beverage components continue to be dispensed while a pour input is actuated by a user or in a batch pour operation where a predetermined volume of one or more selected beverage components are dispensed (e.g., one ounce at a time). UI 1902 may be addressed via a number of methods to select and dispense beverages. For example, a user may interact with UI 1902 via touch input to navigate one or more menus from which to select and dispense a beverage. As another example, a user may type in a code using an onscreen or physical keyboard (not shown) on beverage dispenser 1404 to navigate one or more menus from which to select and dispense a beverage. As a further example, a user may interact with the HMI 1904 via a user interface of an application on the mobile device 1452.

UI 1902, which may include a touch screen and a touch screen controller, may be configured to receive various commands from a user (i.e., consumer input) in the form of touch input, generate a graphics output and/or execute one or more operations with beverage dispenser 1404 (e.g., via HMI 1904 and/or CDM 1906), in response to receiving the aforementioned commands. A touch screen driver in HMI 1904 may be configured to receive the consumer or customer inputs and generate events (e.g., touch screen events) that may then be communicated through a controller to an operating system of HMI 1904.

Beverage dispenser 1404 may be in communication with one or more external device (e.g., mobile device 1452 or POS 1454). In some embodiments, the communication between beverage dispenser 1404 and the external device may be accomplished utilizing any number of communication techniques including, but not limited to, near-field wireless technology such as BLUETOOTH, Wi-Fi and other wireless or wireline communication standards or technologies, via a communication interface.

Figure 20:
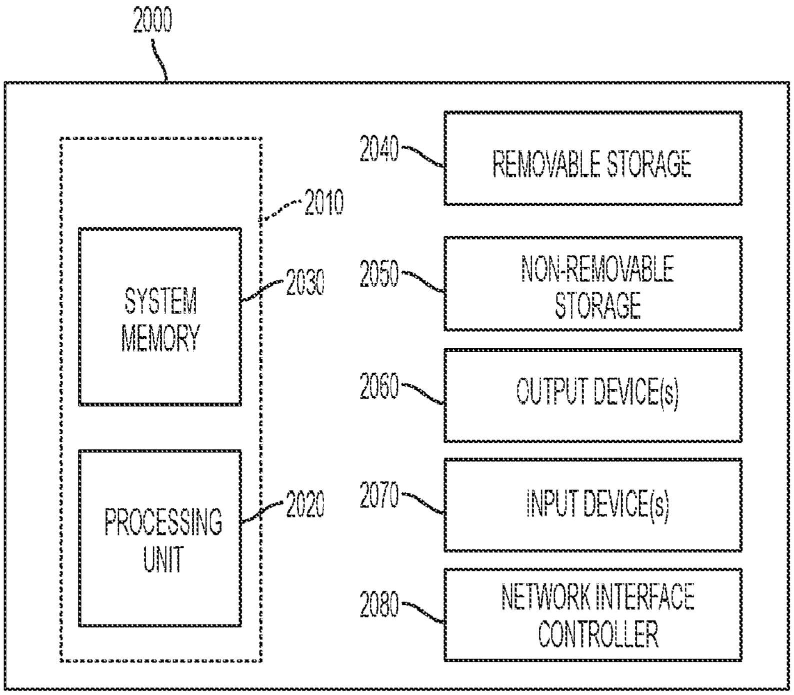
FIG. 20 illustrates an exemplary computer system suitable for implementing the several embodiments of the disclosure.

FIG. 20 illustrates an exemplary computer system 2000 suitable for implementing the several embodiments of the disclosure. For example, one or more components or controller components of the POS terminal 102, mapping server 110, dispenser network server 118, beverage dispenser 122, or beverage dispenser 504 may be implemented as the computer system 2000. In some implementations, one or both of the HMI 1904 and the CDM 1906 may be implemented as the computer system 2000.

It should be appreciated that the logical operations described herein with respect to the various figures may be implemented (1) as a sequence of computer implemented acts or program modules (i.e., software) running on a computing device (e.g., the computing device described in FIG. 11), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 20, an example computing device 2000 upon which embodiments of the invention may be implemented is illustrated. For example, each of the content source, key server, segmentations servers, caching servers, and client devices described herein may each be implemented as a computing device, such as computing device 2000. It should be understood that the example computing device 2000 is only one example of a suitable computing environment upon which embodiments of the invention may be implemented. Optionally, the computing device 2000 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In some embodiments, the computing device 2000 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing device 2000 to provide the functionality of a number of servers that is not directly bound to the number of computers in the computing device 2000. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 2000 typically includes at least one processing unit 2020 and system memory 2030. Depending on the exact configuration and type of computing device, system memory 2030 may be volatile (such as random access memory (RAM)), non-volatile (such as read-only memory (ROM), flash memory, etc.), or some combination of the two. This most basic configuration is illustrated in FIG. 20 by dashed line 2010. The processing unit 2020 may be a standard programmable processor that performs arithmetic and logic operations necessary for operation of the computing device 2000. While only one processing unit 2020 is shown, multiple processors may be present. Thus, while instructions may be discussed as executed by a processor, the instructions may be executed simultaneously, serially, or otherwise executed by one or multiple processors. The computing device 2000 may also include a bus or other communication mechanism for communicating information among various components of the computing device 2000.

Computing device 2000 may have additional features/functionality. For example, computing device 2000 may include additional storage such as removable storage 2040 and non-removable storage 2050 including, but not limited to, magnetic or optical disks or tapes. Computing device 2000 may also contain network connection(s) 2080 that allow the device to communicate with other devices such as over the communication pathways described herein. The network connection(s) 2080 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 2000 may also have input device(s) 2070 such as a keyboard, keypads, switches, dials, mice, track balls, touch screens, voice recognizers, card readers, paper tape readers, or other well-known input devices. Output device(s) 2060 such as a printer, video monitors, liquid crystal displays (LCDs), touch screen displays, displays, speakers, etc. may also be included. The additional devices may be connected to the bus in order to facilitate communication of data among the components of the computing device 2000. All these devices are well known in the art and need not be discussed at length here.

The processing unit 2020 may be configured to execute program code encoded in tangible, computer-readable media. Tangible, computer-readable media refers to any media that is capable of providing data that causes the computing device 2000 (i.e., a machine) to operate in a particular fashion. Various computer-readable media may be utilized to provide instructions to the processing unit 2020 for execution. Example tangible, computer-readable media may include, but is not limited to, volatile media, non-volatile media, removable media, and non-removable media implemented in any method or technology for storage of information such as computer readable instructions, data structures, program modules or other data. System memory 2030, removable storage 2040, and non-removable storage 2050 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 2020 may execute program code stored in the system memory 2030. For example, the bus may carry data to the system memory 2030, from which the processing unit 2020 receives and executes instructions. The data received by the system memory 2030 may optionally be stored on the removable storage 2040 or the non-removable storage 2050 before or after execution by the processing unit 2020.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A beverage dispenser, comprising:

a nozzle configured to dispense one or more beverage ingredients;

a user interface configured to receive a selection to dispense a beverage;

a mass sensor configured to measure a mass of a cup placed thereon;

a pumping or metering device configured to supply a beverage ingredient from an ingredient source to the nozzle for dispensing the beverage; and a controller configured to (i) determine a volume of the cup based on a known mass of an empty cup, the measured mass of the cup and its contents, a density of the contents of the cup, and a fill percentage of the contents of the cup, (ii) determine a volume of the beverage to dispense from the nozzle based on the determined volume of the cup and its contents, and (iii) instruct the pumping or metering device to dispense the volume of the beverage from the nozzle.

2. The beverage dispenser of claim 1, wherein the contents of the cup comprises an amount of ice.

3. The beverage dispenser of claim 1, wherein the controller is further configured to stop dispensing the beverage from the nozzle prior to dispensing the volume of the beverage in response to determining that the measured mass of the cup does not change more than a threshold amount over a predetermined time interval.

4. The beverage dispenser of claim 1, wherein the controller is further configured to stop dispensing the beverage from the nozzle prior to dispensing the volume of the beverage in response to determining that the measured mass of the cup reduced in mass.

5. The beverage dispenser of claim 1, wherein the controller is configured to determine the volume of the cup with a first cup detection algorithm that assumes the cup is empty and a second cup detection algorithm that assumes the cup contains contents.

6. The beverage dispenser of claim 5, wherein the controller is configured to determine with the first cup detection algorithm a preliminary cup size prediction that selects each cup size with a mass that is within a match threshold of the measured mass of the cup.

7. The beverage dispenser of claim 6, wherein the controller is configured to determine the volume of the cup upon selection of a cup size from the selected cups of the preliminary cup size prediction with a smallest absolute difference between a mass of the selected cups and the measured mass of the cup.

8. The beverage dispenser of claim 5, wherein the controller is configured to compare with the second cup detection algorithm the measured mass of the cup with a known list of cup masses of different cup sizes determined based on an expected mass of each of the different cup sizes when it is full of ice and an expected percentage of each of the different cup sizes that is expected to be filled with ice.

9. The beverage dispenser of claim 8, wherein the controller is configured to determine a preliminary cup size prediction that selects each cup size associated with the known list of cup masses with a mass that is within an upper match threshold and a lower match threshold of the measured mass of the cup.

10. The beverage dispenser of claim 9, wherein the controller is configured to determine the volume of the cup upon selection of a cup size from the selected cups of the preliminary cup size prediction with a smallest absolute difference between a mass of the selected cups and the measured mass of the cup.

11. The beverage dispenser of claim 1, wherein the user interface is configured to display a cup size based on the determined volume of the cup.

12. The beverage dispenser of claim 11, wherein the user interface is configured to receive a selection of a different cup size.

13. The beverage dispenser of claim 1, wherein the mass sensor is located beneath the nozzle.

14. The beverage dispenser of claim 13, wherein the mass sensor comprises a platform assembly releasably coupled to a mass sensor assembly.

15. The beverage dispenser of claim 14, wherein the platform assembly comprises a cup rest, a central fluid diverter, and a drain.

16. The beverage dispenser of claim 15, wherein the central fluid diverter comprises a magnetic insert.

17. The beverage dispenser of claim 16, wherein the mass sensor assembly comprises a magnet holder with a magnet held therein, the magnet holder coupled to a sensor body, and the magnet holder positioned to align with the magnetic insert.

18. The beverage dispenser of claim 17, wherein the sensor body comprises a load cell, wherein the load cell comprises a first end coupled to a housing of the mass sensor assembly and a second end coupled to the magnet holder.

19. The beverage dispenser of claim 1, wherein the selection to dispense the beverage comprises a size of the cup.

20. The beverage dispenser of claim 19, wherein the controller is further configured to determine that the measured mass of the cup is within a valid mass range for the size of the cup.

* * * * *